US012732618B2

(12) United States Patent
Sim et al.

(10) Patent No.: US 12,732,618 B2

(45) Date of Patent: Sep. 8, 2026

(54) METHOD AND APPARATUS FOR VIDEO CODING USING MOTION VECTOR DIFFERENCE DERIVATION

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Dong Gyu Sim, Seoul (KR); Min Hun Lee, Uijeongbu-si (KR); Joo Hyung Byeon, Seoul (KR); Jin Heo, Yongin-si (KR); Seung Wook Park, Yongin-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 27 days.

(21) Appl. No.: 18/797,054

(22) Filed: Aug. 7, 2024

(65) Prior Publication Data

US 2024/0397054 A1 Nov. 28, 2024

Related U.S. Application Data

(63) Continuation of application No. PCT/KR2023/001578, filed on Feb. 3, 2023.

(30) Foreign Application Priority Data

Mar. 3, 2022 (KR) ........................ 10-2022-0027554
Feb. 2, 2023 (KR) ........................ 10-2023-0014294

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/159* (2014.11); *H04N 19/176* (2014.11)

(58) Field of Classification Search
CPC .. H04N 19/137; H04N 19/105; H04N 19/159; H04N 19/176; H04N 19/109;
(Continued)

(56) References Cited

U.S. PATENT DOCUMENTS

2021/0385462 A1 12/2021 Deng et al.

FOREIGN PATENT DOCUMENTS

WO WO-2020221256 A1 * 11/2020 ........... H04N 19/176

OTHER PUBLICATIONS

Muhammed Coban, “Algorithm description of Enhanced Compression Model 3 (ECM 3)”, Joint Video Experts Team (JVET) of ITU-T SG 16 WP 3 and ISO/IEC JTC 1/SC 29 24th Meeting, by teleconference, JVET-X2025-v2, Jan. 7, 2022 : May 9, 2023]. < URL: https://www.jvet-experts.org/doc_end_user/current_document.php?id (Year: 2022).*

(Continued)

*Primary Examiner* — Hesham K Abouzahra

(74) *Attorney, Agent, or Firm* — MCDONNELL BOEHNEN HULBERT & BERGHOFF LLP

(57) ABSTRACT

A method and an apparatus for video coding using a motion vector difference derivation includes parsing one motion vector difference when a motion vector pair is derived during bi-directional inter-prediction of the current block. The video coding method and the apparatus use the parsed one motion vector difference to derive the remaining motion vector difference or to refine the remaining motion vector.

13 Claims, 15 Drawing Sheets

(51) Int. Cl.
*H04N 19/159* (2014.01)
*H04N 19/176* (2014.01)

(58) Field of Classification Search
CPC ...... H04N 19/513; H04N 19/52; H04N 19/70; H04N 19/577
See application file for complete search history.

(56) References Cited

OTHER PUBLICATIONS

Muhammed Coban, "Algorithm description of Enhanced Compression Model 3 (ECM 3)", Joint Video Experts Team (JVET) of ITU-T SG 16 WP 3 and ISO/IEC JTC 1/SC 29 24th Meeting, by teleconference, JVET-X2025-v2, Jan. 7, 2022 : May 9, 2023]. <URL: https://www.jvet-experts.org/doc_end_user/current_document.php?id=11231>.

Zhi Zhang, "Non-EE2: MVD and merge index signaling of AMVP-merge mode": Joint Video Experts Team (JVET) of ITU-T SG 16 WP 3 and ISO/IEC JTC 1/SC 29 25th Meeting, by teleconference, JVET-Y0129-v1, Jan. 5, 2022: May 9, 2023]. <URL: https://www.jvet-experts.org/doc_end_user/current_document.php?id=11323>.

Donghyun Kim, "AHG12: Bilateral matching SMVD mode", Joint Video Experts Team (JVET) of ITU-T SG 16 WP 3 and ISO/IEC JTC 1/SC 29 24th Meeting, by teleconference, JVET-X0058-v2, Oct. 6, 2021: May 9, 2023]. <URL: https://www.jvet-experts.org/doc_end_user/current_document.php?id=11051>.

* cited by examiner

METHOD AND APPARATUS FOR VIDEO CODING USING MOTION VECTOR DIFFERENCE DERIVATION

CROSS REFERENCE TO RELATED APPLICATIONS

This application is a continuation of International Application No. PCT/KR2023/001578 filed on Feb. 3, 2023, which claims priority to and the benefit of Korean Patent Application No. 10-2022-0027554 filed on Mar. 3, 2022, and Korean Patent Application No. 10-2023-0014294, filed on Feb. 2, 2023, the entire contents of each of which are incorporated herein by reference.

TECHNICAL FIELD

The present disclosure relates to a video coding method and an apparatus using a motion vector difference derivation.

BACKGROUND

The statements in this section merely provide background information related to the present disclosure and do not necessarily constitute prior art.

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/Advanced Video Coding (AVC), High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

In VVC technology, the Symmetric Motion Vector Difference (SMVD) technique as illustrated in FIG. 6 is a method for efficiently transmitting motion vector difference (MVD) during bi-directional inter prediction. When the SMVD mode is applied for the case where the two reference pictures are symmetric with respect to the current picture, the encoder sends the motion vector difference of L0 (L0_MVD) and the SMVD flag to the decoder. The decoder parses the SMVD flag, and parses and then uses the motion vector difference of L0 to derive the motion vector difference of L1 (L1_MVD). At this time, the decoder may derive the motion vector difference of L1 by setting the magnitude of the motion vector difference of L1 to be the same as that of L0 and setting the direction of the motion vector difference of L1 to be opposite to that of L0. As shown in the above example, to enhance the video quality and increase the coding efficiency, there is a need to provide an effective transmission and derivation method of the motion vector difference.

SUMMARY

The present disclosure seeks to provide a video coding method and an apparatus that parse one motion vector difference when a motion vector pair is derived during bi-directional inter-prediction of the current block to enhance video quality and increase video coding efficiency. The video coding method and the apparatus use the one motion vector difference to derive the remaining motion vector difference or to refine the remaining motion vector.

At least one aspect of the present disclosure provides a method performed by a video decoding device for decoding a motion vector of a current block. The method includes decoding, from a bitstream, reference picture indices that are in a bi-direction manner and are of the current block. The reference picture indices indicate reference pictures that are in the bi-direction manner and includes an LX reference picture (where X=0 or X=1) and an L1-X reference picture. The method also includes decoding, from the bitstream, motion vector indices that are in the bi-direction manner. The motion vector indices indicate motion vectors that are in the bi-direction manner and includes an LX motion vector and an L1-X motion vector. The LX motion vector includes a horizontal LX motion vector and a vertical LX motion vector, and the L1-X motion vector includes a horizontal L1-X motion vector and a vertical L1-X motion vector. The method also includes decoding, from the bitstream, an LX motion vector difference that comprises a horizontal LX motion vector difference and a vertical LX motion vector difference. The method also includes deriving an L1-X motion vector difference by using the LX motion vector difference. The L1-X motion vector difference includes a horizontal L1-X motion vector difference and a vertical L1-X motion vector difference.

Another aspect of the present disclosure provides a method performed by a video encoding device for encoding a motion vector of a current block. The method includes determining reference picture indices that are in a bi-direction manner and are of the current block. The reference picture indices indicate reference pictures that are in the bi-direction manner and include an LX reference picture (where X=0 or X=1) and an L1-X reference picture. The method also includes determining motion vector indices that are in the bi-direction manner. The motion vector indices indicate motion vectors that are in the bi-direction manner and include an LX motion vector and an L1-X motion vector. The LX motion vector includes a horizontal LX motion vector and a vertical LX motion vector, and the L1-X motion vector includes a horizontal L1-X motion vector and a vertical L1-X motion vector. The method also includes calculating an LX motion vector difference that includes a horizontal LX motion vector difference and a vertical LX motion vector difference. The method also includes deriving an L1-X motion vector difference by using the LX motion vector difference. The L1-X motion vector difference includes a horizontal L1-X motion vector difference and a vertical L1-X motion vector difference.

Yet another aspect of the present disclosure provides a computer-readable recording medium storing a bitstream generated by a video encoding method. The video encoding method includes determining reference picture indices that are in a bi-direction manner and are of a current block. The reference picture indices indicate reference pictures that include an LX reference picture (where X=0 or X=1) and an L1-X reference picture. The video encoding method also includes determining motion vector indices that are in the bi-direction manner. The motion vector indices indicate motion vectors that are in the bi-direction manner and include an LX motion vector and an L1-X motion vector. The LX motion vector includes a horizontal LX motion vector and a vertical LX motion vector, and the L1-X motion vector includes a horizontal L1-X motion vector and a vertical L1-X motion vector. The video encoding method also includes calculating an LX motion vector difference that comprises a horizontal LX motion vector difference and a vertical LX motion vector difference. The video encoding method also includes deriving an L1-X motion vector difference by using the LX motion vector difference. The L1-X motion vector difference includes a horizontal L1-X motion vector difference and a vertical L1-X motion vector difference.

As described above, the present disclosure provides a video coding method and an apparatus that parse one motion vector difference when a motion vector pair is derived during bi-directional inter-prediction of the current block. The video coding method and the apparatus use the one motion vector difference to derive the remaining motion vector difference or to refine the remaining motion vector. Thus, the video coding method and the apparatus improve video quality and increase video coding efficiency.

DETAILED DESCRIPTION

Figure 1:
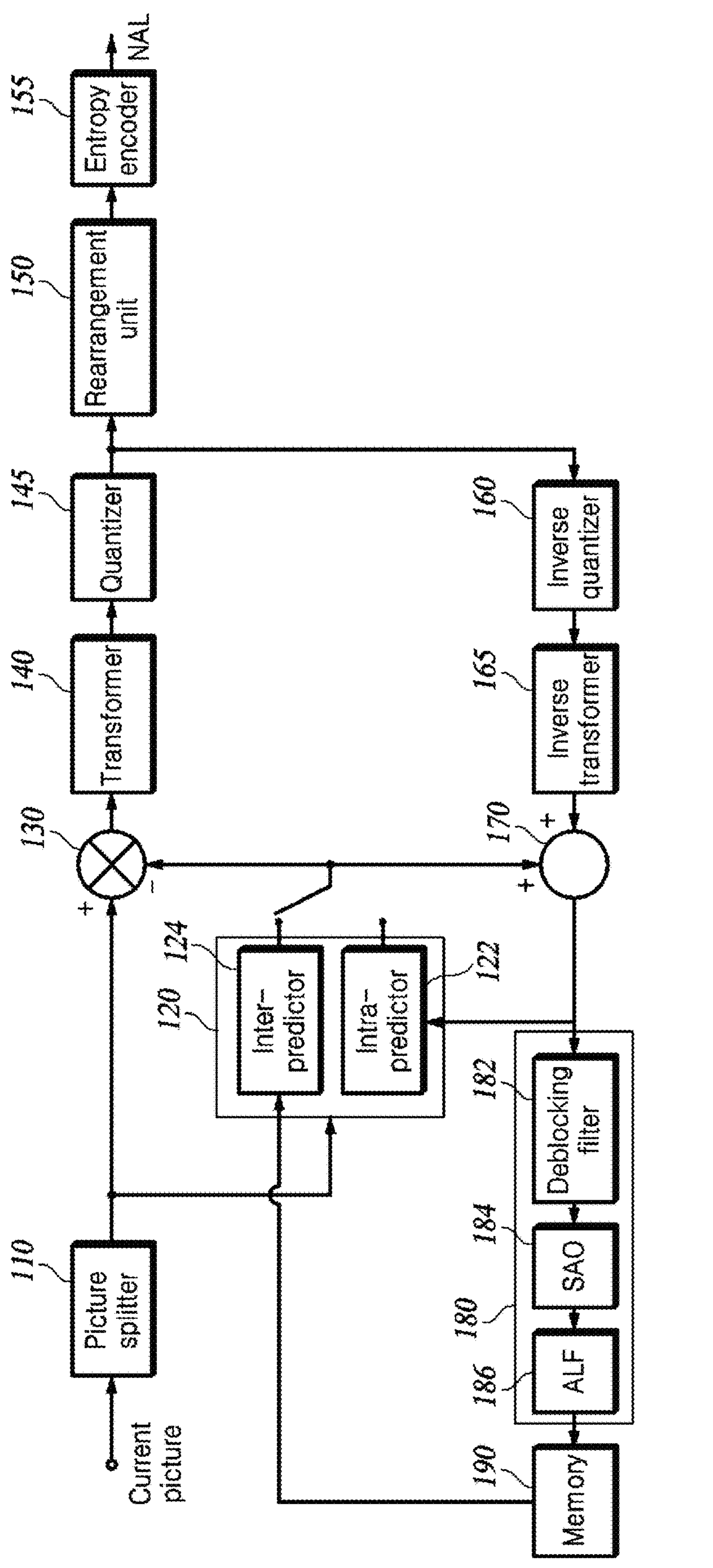
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a binarytree ternarytree (BTTT) is added to the tree structures to be referred to as a multiple-type tree (MTT).

Figure 2:
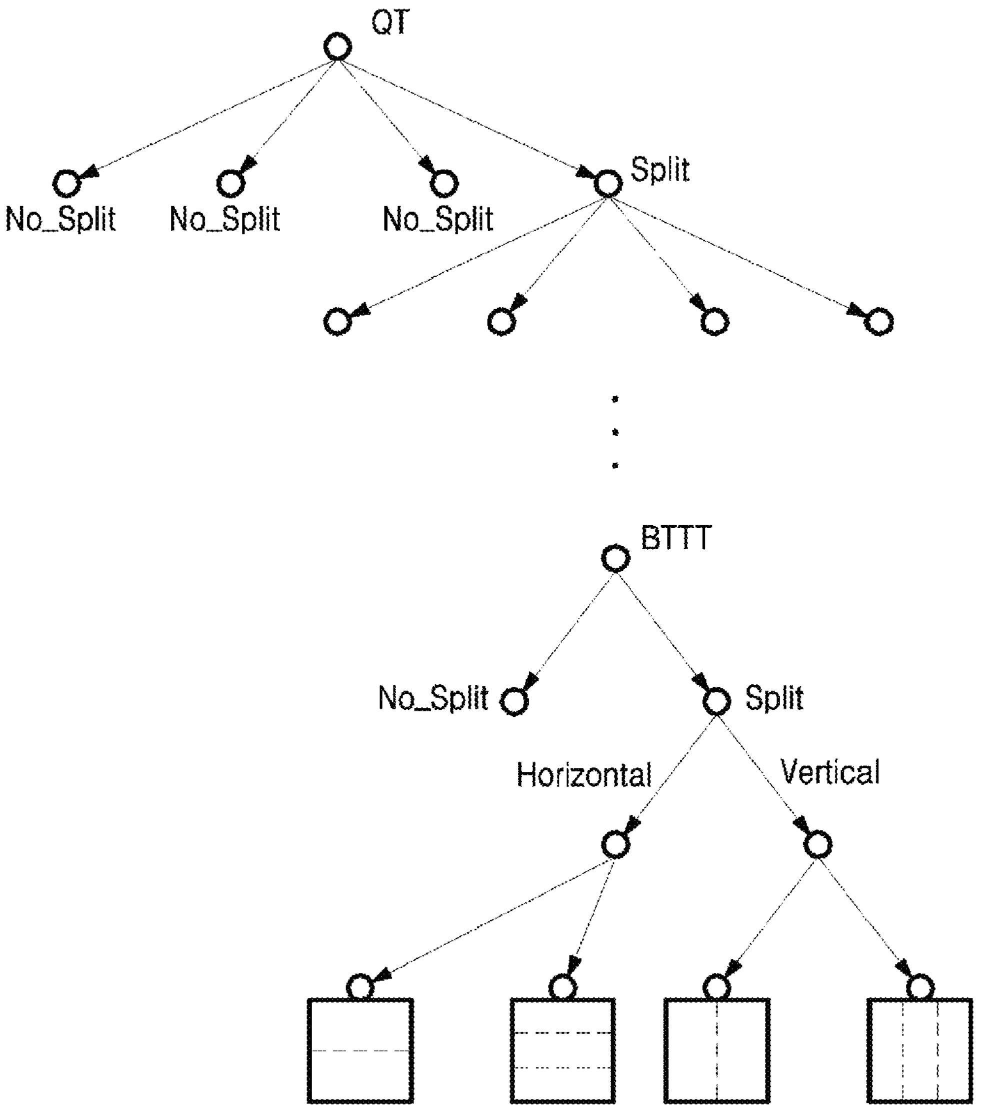
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split-_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
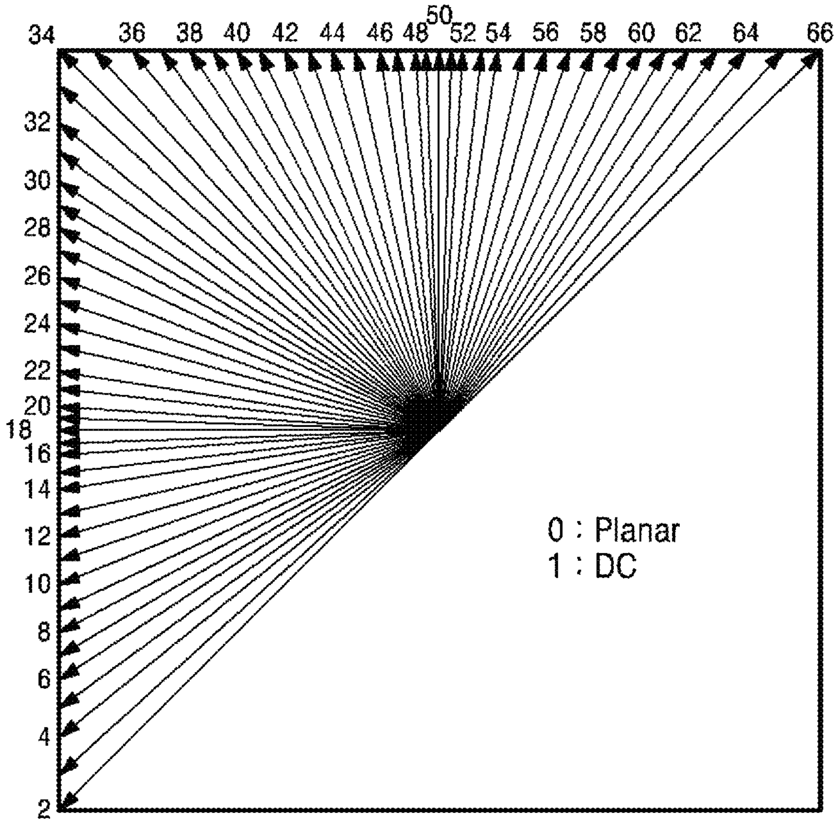
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
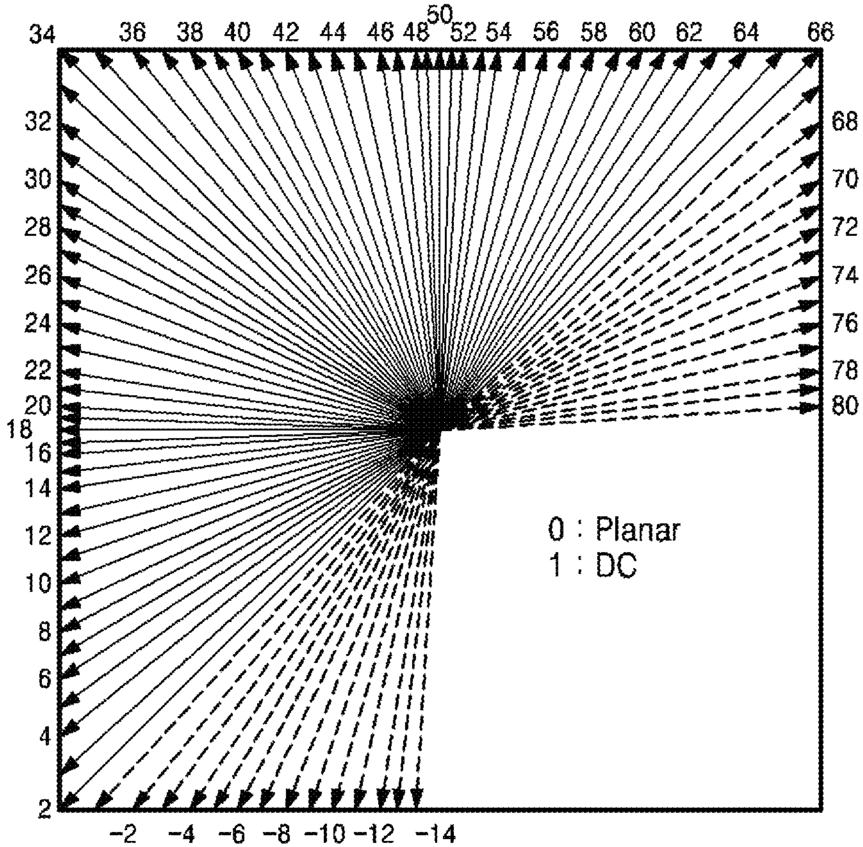

For efficient directional prediction for the current block having a rectangular shape, directional modes (#67 to #80, intra prediction modes #-1 to #-14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current block in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
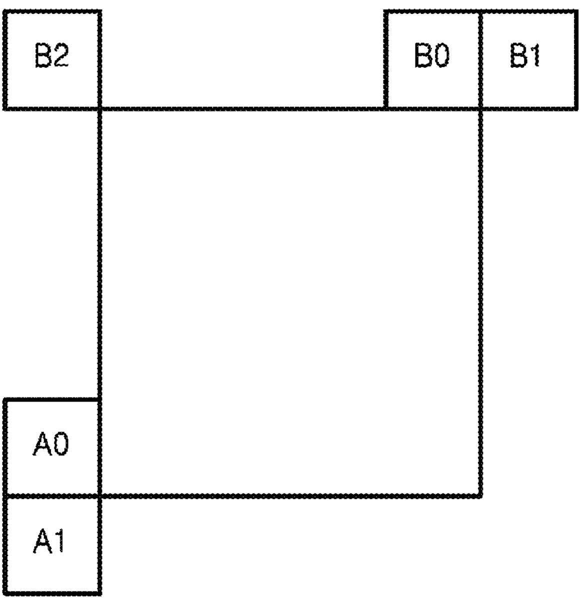
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
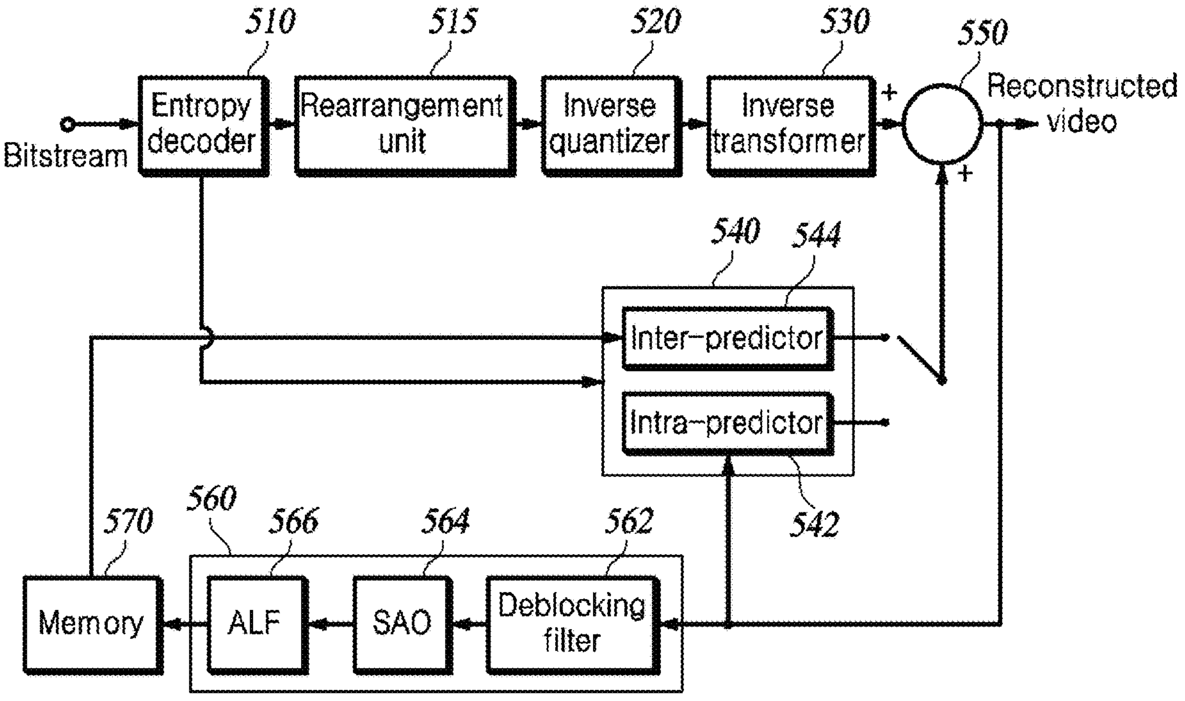
FIG. 5 is a block diagram of a video decoding apparatus that may implement the techniques of the present disclosure.
Figure 6:
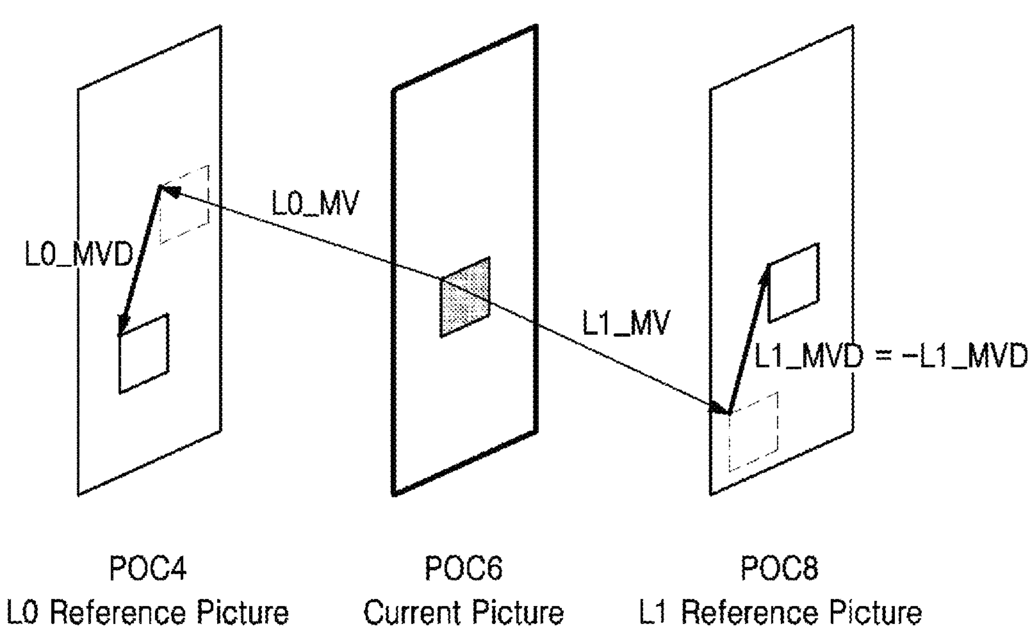
FIG. 6 is a diagram illustrating a method of transmitting a motion vector difference.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus that parse one motion vector difference when a motion vector pair is derived during bi-directional inter-prediction of the current block. The video coding method and the apparatus use the one motion vector difference to derive the remaining motion vector difference or to refine the remaining motion vector.

The following embodiments may be performed by the inter predictor 124 in the video encoding device. The following embodiments may also be performed by the inter predictor 544 in the video decoding device.

The video encoding device in encoding the current block may generate signaling information associated with the present embodiments in terms of optimizing rate distortion. The video encoding device may use the entropy encoder 155 to encode the signaling information and transmit the encoded signaling information to the video decoding device. The video decoding device may use the entropy decoder 510 to decode, from the bitstream, the signaling information associated with decoding the current block.

In the following description, the term "target block" may be used interchangeably with the current block or coding unit (CU). The term "target block" may refer to some region of the coding unit.

Further, the value of one flag being true indicates when the flag is set to 1. Additionally, the value of one flag being false indicates when the flag is set to 0.

I. Merge/Skip Mode and MMVD of Inter Prediction

The following embodiments are described centering on the inter predictor 124 in the video encoding device, but may also be performed by the inter predictor 544 in the video decoding device as described above.

The following describes a method of composing a merging candidate list of motion information in a merged/skipped mode of inter prediction. To support the merge/skip mode, the inter predictor 124 in the video encoding device may select a preset number of merge candidates (e.g., six) to form a merging candidate list.

The inter predictor 124 searches for the spatial merge candidates. The inter predictor 124 detects spatial merge candidates from neighboring blocks, as illustrated in FIG. 4. At most four spatial merge candidates may be selected.

The inter predictor 124 searches for a temporal merge candidate. The inter predictor 124 may add, as a temporal merge candidate, a block that is co-located with the current block within a reference picture other than the current picture holding the target block. Here, the reference picture may or may not be the same as the reference picture used to predict the current block. One temporal merge candidate may be selected.

The inter predictor 124 searches for a history-based motion vector predictor (HMVP) candidate. The inter predictor 124 may store the previous motion vectors of the h CUs (where h is a natural number) in a table and may utilize the stored motion vectors as merge candidates. The size of the table is 6, and the table stores the previous motion vectors of the CUs in a FIFO (first-in first out) manner. This indicates that at most six HMVP candidates are stored in the table. The inter predictor 124 may set as the merge candidates the most recent motion vectors among the HMVP candidates stored in the table.

The inter predictor 124 searches for PAMVP (Pairwise Average MVP) candidates. The inter predictor 124 may set as the merge candidate the average of the motion vectors of the first candidate and the second candidate in the merging candidate list.

If the merging candidate list cannot be fulfilled (i.e., the preset number of candidates is not filled) after performing all of the above described search processes, the inter predictor 124 adds the zero motion vector as a merge candidate.

In terms of optimizing coding efficiency, the inter predictor 124 may determine a merge index that indicates one candidate in the merging candidate list. The inter predictor 124 may use the merge index to derive a motion vector predictor (MVP) from the merging candidate list, and then may determine the MVP as the motion vector of the current block. Further, the video encoding device may signal the merge index to the video decoding device.

In the skip mode, the video encoding device utilizes the same motion vector transmission method as in the merge mode but does not transmit a residual block corresponding to the difference between the current block and the prediction block.

The above described method of composing the merging candidate list may be performed equally by the inter predictor 544 in the video decoding device. The video decoding device may decode the merge index. The inter predictor 544 may use the merge index to derive the MVP from the merging candidate list, and then may determine the MVP as the motion vector of the current block.

On the other hand, when the Merge mode with Motion Vector Difference (MMVD) technique is utilized, the inter predictor 124 may use the merge index to derive the MVP from the merging candidate list. For example, the first or second candidate of the merging candidate list may be used as the MVP. Further, in terms of optimizing the coding efficiency, the inter predictor 124 determines a distance index and a direction index. The inter predictor 124 may use the distance index and the direction index to derive a motion vector difference (MVD), and then may sum the MVD and the MVP to reconstruct the motion vector of the current block. Further, the video encoding device may signal the merge index, the distance index, and the direction index to the video decoding device.

The MMVD technique described above may be equally performed by the inter predictor 544 in the video decoding device. The video decoding device may decode the merge index, the distance index, and the direction index. After composing the merging candidate list, the inter predictor 544 may use the merge index to derive the MVP from the merging candidate list. The inter predictor 544 may use the distance index and the direction index to derive the MVD, and then may sum the MVD and the MVP to reconstruct the motion vector of the current block.

II. AMVP Mode and AMVR of Inter Prediction

The following embodiments are described centering on the inter predictor 124 in the video encoding device, but may also be performed by the inter predictor 544 in the video decoding device as described above.

Hereinafter, a method is described for composing a candidate list of motion information in an Advanced Motion Vector Prediction mode (AMVP mode) of inter prediction. To support the AMVP mode, the inter predictor 124 in the video encoding device may select a preset number of (e.g., two) candidates to form a candidate list.

The inter predictor 124 searches for the spatial candidates. The inter predictor 124 searches for spatial candidates from neighboring blocks, as illustrated in FIG. 4. Up to two spatial candidates may be selected.

The inter predictor 124 searches for a temporal candidate. The inter predictor 124 may add, as a temporal candidate, a block that is co-located with the current block within a reference picture other than the current picture holding the target block. Here, the reference picture may or may not be the same as the reference picture used to predict the current block. One temporal merge candidate may be selected.

If the candidate list cannot be fulfilled (i.e., the preset number of candidates is not fulfilled) after performing all of the above-described search processes, the inter predictor 124 adds a zero motion vector as a candidate.

In terms of optimizing coding efficiency, the inter predictor 124 may determine a candidate index that indicates one candidate in the candidate list. The inter predictor 124 may use the candidate index to derive an MVP from the candidate list. Further, in terms of optimizing the coding efficiency, the inter predictor 124 determines the motion vector and subtracts the MVP from the motion vector to calculate the MVD. Further, the video encoding device may signal the candidate index and the MVD to the video decoding device.

The above described method of composing the AMVP candidate list may be equally performed by the inter predictor 544 in the video decoding device. The video decoding device may decode the candidate index and the MVD. The inter predictor 544 may use the candidate index to derive an MVP from the candidate list. The inter predictor 544 may sum the MVD and MVP to reconstruct the motion vector of the current block.

Meanwhile, the video encoding device transmits information for determining the spatial resolution of the MVD along with the MVD. When AMVR technology is used, the video encoding device may determine an adaptive spatial resolution of the MVD in terms of optimizing rate distortion. In this case, the spatial resolution of the MVD may be the same as that of the motion vector.

When AMVR technology is used, the video encoding device signals amvr_flag and amvr_precision_idx to the video decoding device to indicate the spatial resolution of the MVD. For example, if amvr_flag is signaled as 0, the video decoding device sets the MVD to ¼-pel spatial resolution. On the other hand, if amvr_flag is not zero, the video decoding device may determine the spatial resolution of the MVD according to amvr_precision_idx. In this case, the spatial resolution of the selectable MVD may vary depending on the prediction method applied with AMVR. The prediction methods to which AMVR can be applied include a regular AMVP mode, an affine AMVP mode, an intra block copy (IBC) AMVP mode, and the like.

III. Derivation of Motion Vector Difference According to Embodiments

The following embodiments are described centering on the video decoding device, but may also be performed by the video encoding device as described above.

Figure 7:
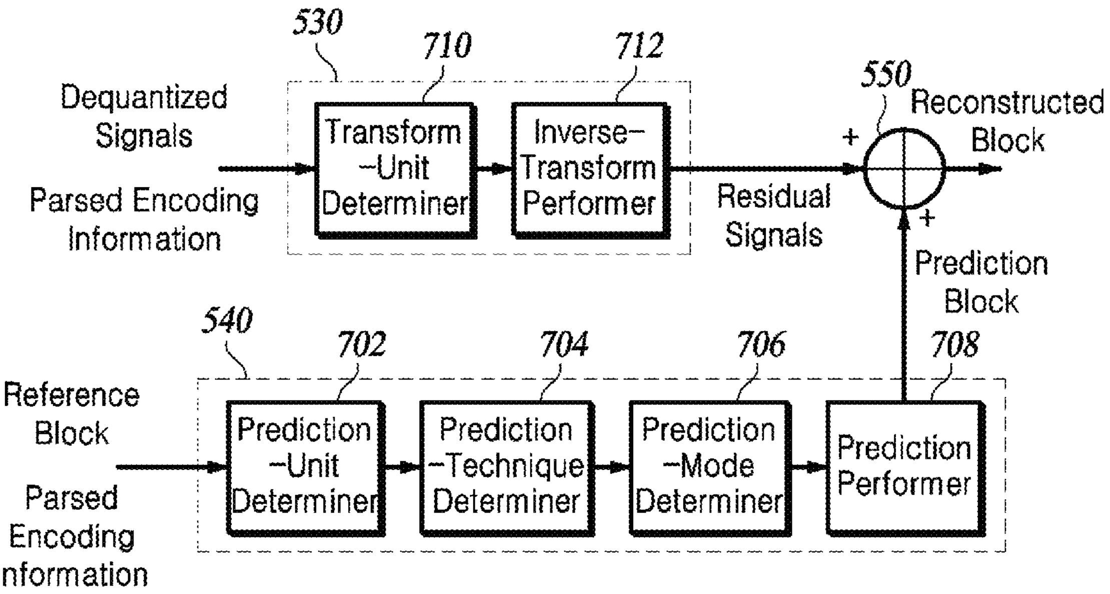
FIG. 7 is a block diagram of a detailed portion of a video decoding device, according to at least one embodiment of the present disclosure.

FIG. 7 is a block diagram of a detailed portion of the video decoding device, according to at least one embodiment of the present disclosure.

The video decoding device according to at least one embodiment of the present disclosure may determine prediction unit and transform unit, may perform a prediction and an inverse transform on the current block corresponding to the determined unit by using a prediction technique and a prediction mode, and may finally generate a reconstructed block of the current block. As FIG. 7 describes itself, the process may be performed by an inverse transformer 530, a predictor 540, and an adder 550 of the video decoding device. Alternatively, the same operations as illustrated in FIG. 7 may be performed by the inverse transformer 165, the picture splitter 110, the predictor 120, and the adder 170 of the video encoding device. In this case, the video decoding device uses the encoded information parsed from the bitstream, but the video encoding device may use the encoded information set at a higher level in terms of optimizing rate distortion. Hereinafter, for the sake of convenience, the embodiments of the present disclosure are described centering on the video decoding device.

The predictor 540 as illustrated in FIG. 5 includes the intra predictor 542 and the inter predictor 544, depending on the prediction technique, but the predictor 540 as illustrated in FIG. 7 may include all or some of a prediction-unit determiner 702, a prediction-technique determiner 704, a prediction-mode determiner 706, and a prediction-performer 708. The prediction-unit determiner 702 determines a prediction unit (PU). The PU may be the current block or a single subblock of the subblocks obtained by dividing the current block. The prediction-technique determiner 704 determines a prediction technique for the PU, such as intra prediction, inter prediction, or Intra Block Copy prediction (IBC prediction). The prediction-mode determiner 706 determines a detailed prediction mode for the prediction technique. The prediction performer 708 generates a prediction block of the current block according to the determined prediction mode.

The inverse transformer 530 includes a transform-unit determiner 710 and an inverse-transform performer 712. The transform-unit determiner 710 determines a transform unit (TU) for the inverse quantization signals of the current block, and the inverse-transform performer 712 inversely transforms the transform unit represented by the inverse quantization signals to generate residual signals.

The adder 550 sums the prediction block and the residual signals to generate a reconstructed block. The reconstructed block may be stored in memory and then may be used for the prediction of other blocks.

In one example, if inter prediction is determined as the prediction technique of the current block, the video decoding device may parse the skip_flag. If skip_flag is equal to one, the video decoding device may omit the inverse transforming process. On the other hand, the video encoding device may determine the skip_flag and may signal the skip_flag to the video decoding device in terms of optimizing the coding efficiency.

Further, the prediction-mode determiner 706 in the video decoding device may parse the flag indicating the application of the merge mode or the AMVP mode to determine the inter-prediction mode of the current block. On the other hand, the video encoding device may signal to the video decoding device the above described flag after determining the same in terms of optimizing the coding efficiency.

Further, if the prediction mode of the current block is determined to be an AMVP mode for inter prediction, the video decoding device may parse the information required for the prediction process. Further, if the current slice is a Bi-directional slice (B-slice), the video decoding device may parse information indicating whether the prediction of the current block is performed as a uni-directional prediction or a bi-directional prediction. Meanwhile, the video encoding device may determine and then may signal the above described information to the video decoding device in terms of optimizing the coding efficiency.

Figure 8A:
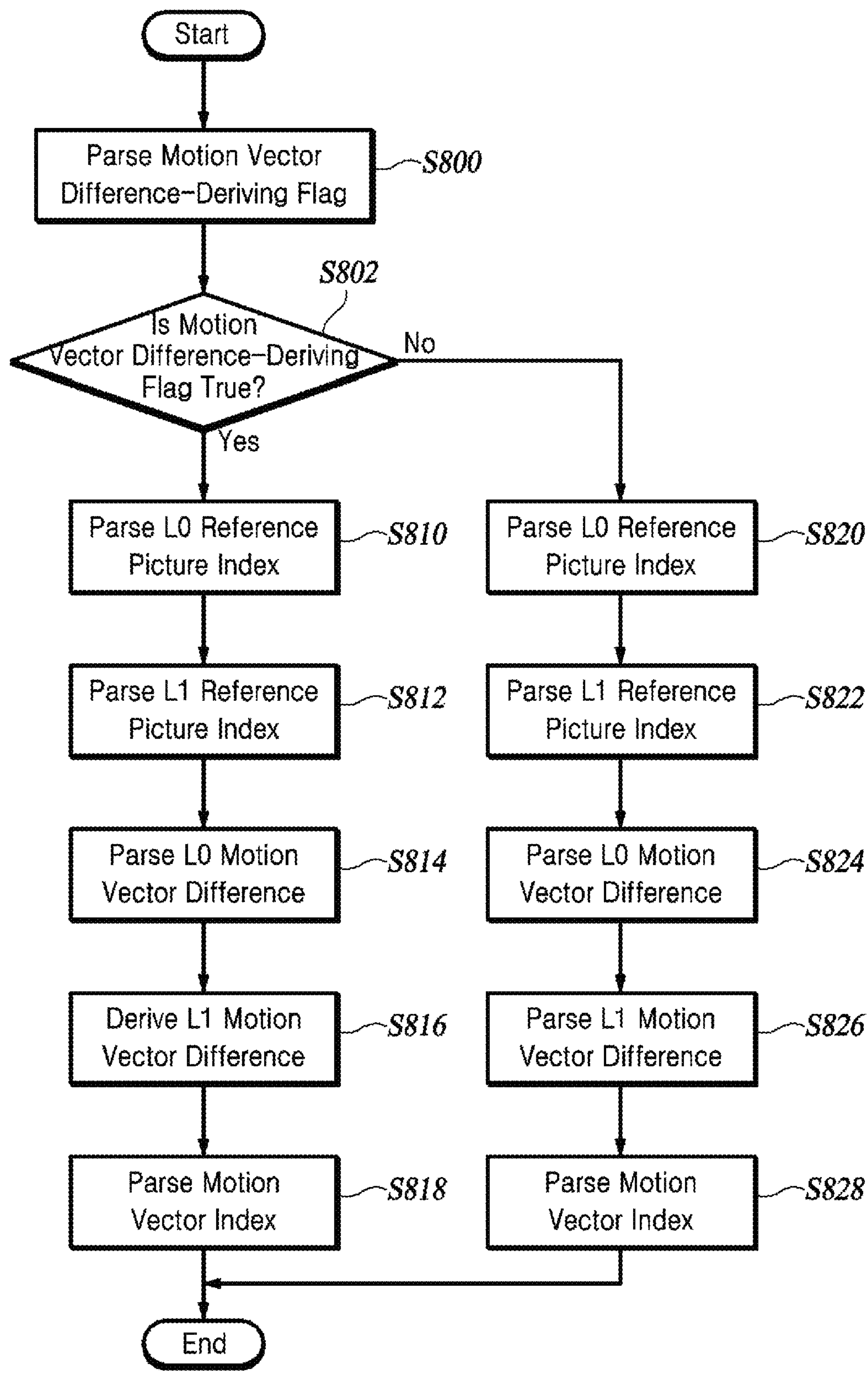
FIGS. 8A and 8B are flowcharts illustrating parsing and derivation of motion vector differences, according to at least one embodiment of the present disclosure.
Figure 8B:
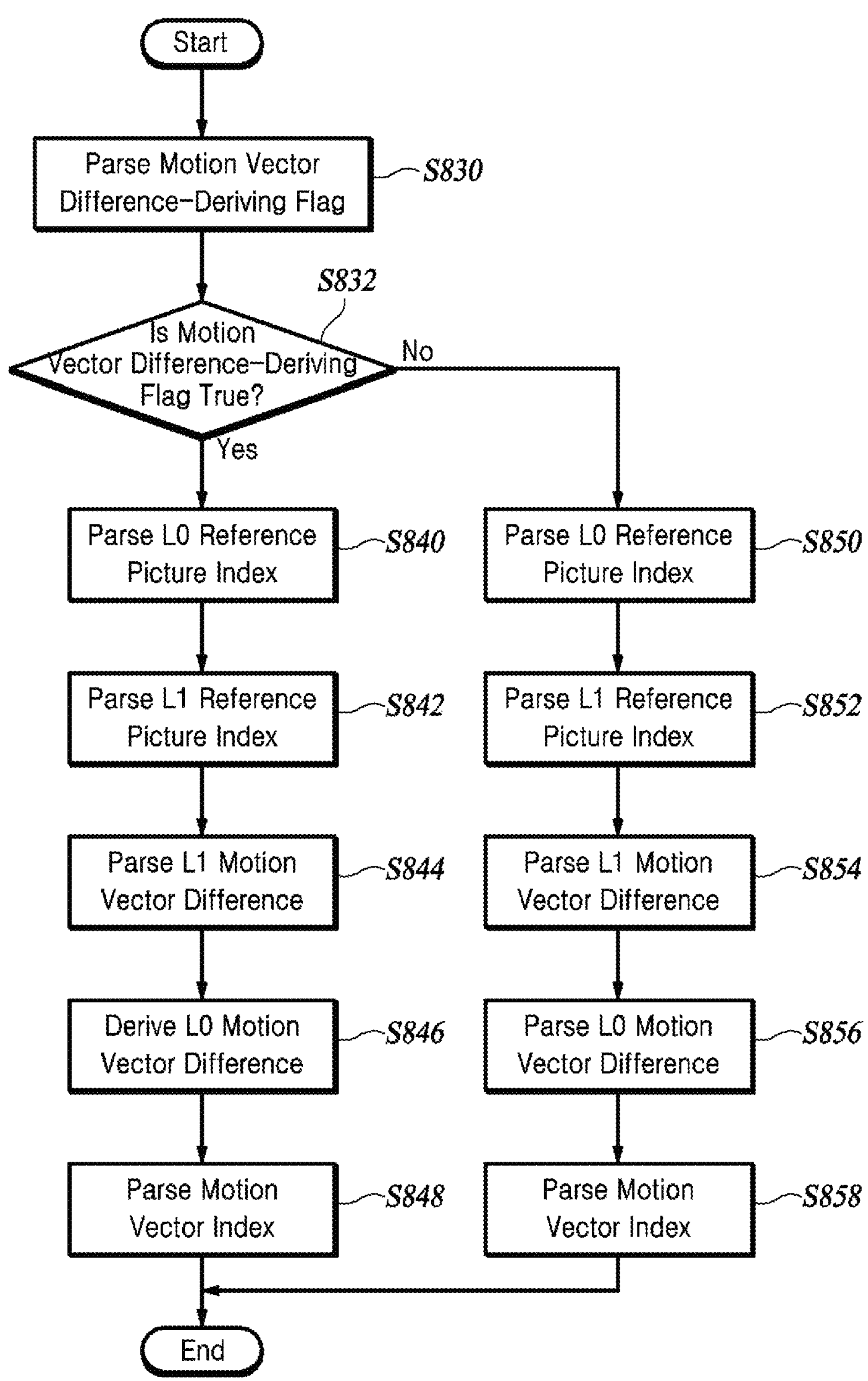

FIGS. 8A and 8B are flowcharts illustrating parsing and derivation of motion vector differences, according to at least one embodiment of the present disclosure.

In one example, if the current block is predicted according to inter-prediction mode, AMVP mode, and bi-directional prediction, the video decoding device may parse the indices of the reference picture lists of L0 and L1, and the motion vector difference in each direction. The video encoding device may determine and signal these information items to the video decoding device in terms of optimizing the coding efficiency. Here, L0 reference picture list refers to reference picture list 0, and L1 reference picture list refers to reference picture list 1. Hereinafter, L0 and L1 are collectively referred to as bi-directional or a bi-direction manner. Additionally, LX and L1-X (X=0 or X=1) are used to represent L0 and L1.

Alternatively, as shown in the examples of FIG. 8A or FIG. 8B, the video decoding device may parse and derive motion vector differences. In the example of FIG. 8A, an L0 motion vector difference (L0_MVD) is parsed and an L1 motion vector difference (L1_MVD) is derived. In the example of FIG. 8B, the L1 motion vector difference is parsed and the L0 motion vector difference is derived. Meanwhile, a prior arrangement between the video encoding device and the video decoding device may determine which one of the methods illustrated in FIGS. 8A and 8B is to be used. Alternatively, the video encoding device may signal information to the video decoding device indicating which of the methods illustrated in FIGS. 8A and 8B to be used.

In the following, parsing and derivation of motion vector differences are described by only using the example of FIG. 8A. Comparing to FIG. 8A, the L1 motion vector difference is parsed (S844) and the L0 motion vector difference is derived (S846) as shown in FIG. 8B. The other steps rather than S844 and S846 of FIG. 8B are equivalent to the corresponding steps of FIG. 8A. Thus, the detailed description of FIG. 8B is omitted.

The video decoding device may parse the motion vector difference-derivation flag indicating the derivation of the motion vector differences (S800), and then may check the motion vector difference-derivation flag (S802) to parse and derive the motion vector differences according to that flag's value.

If the motion vector difference-derivation flag is true (Yes in S802), the following steps are performed The video decoding device parses the L0 and L1 reference picture indices (S810, S812). The video decoding device parses the L0 motion vector difference (S814) and uses the parsed motion vector difference to derive the L1 motion vector difference (S816). The video decoding device parses the motion vector indices (S818) and uses the parsed motion vector indices to generate motion vector predictors. The video decoding device may then sum the motion vector predictors and the motion vector differences to finally generate bi-directional motion vectors.

If the motion vector difference-derivation flag is false (No in S802), the following steps are performed.

The video decoding device parses the L0, L1 reference picture indices (S820, S822). The video decoding device parses the L0, L1 motion vector differences (S824, S826). The video decoding device parses the motion vector indices (S828) and uses the parsed motion vector indices to generate motion vector predictors. The video decoding device may then sum the motion vector predictors and the motion vector differences to finally generate bi-directional motion vectors.

Figure 9A:
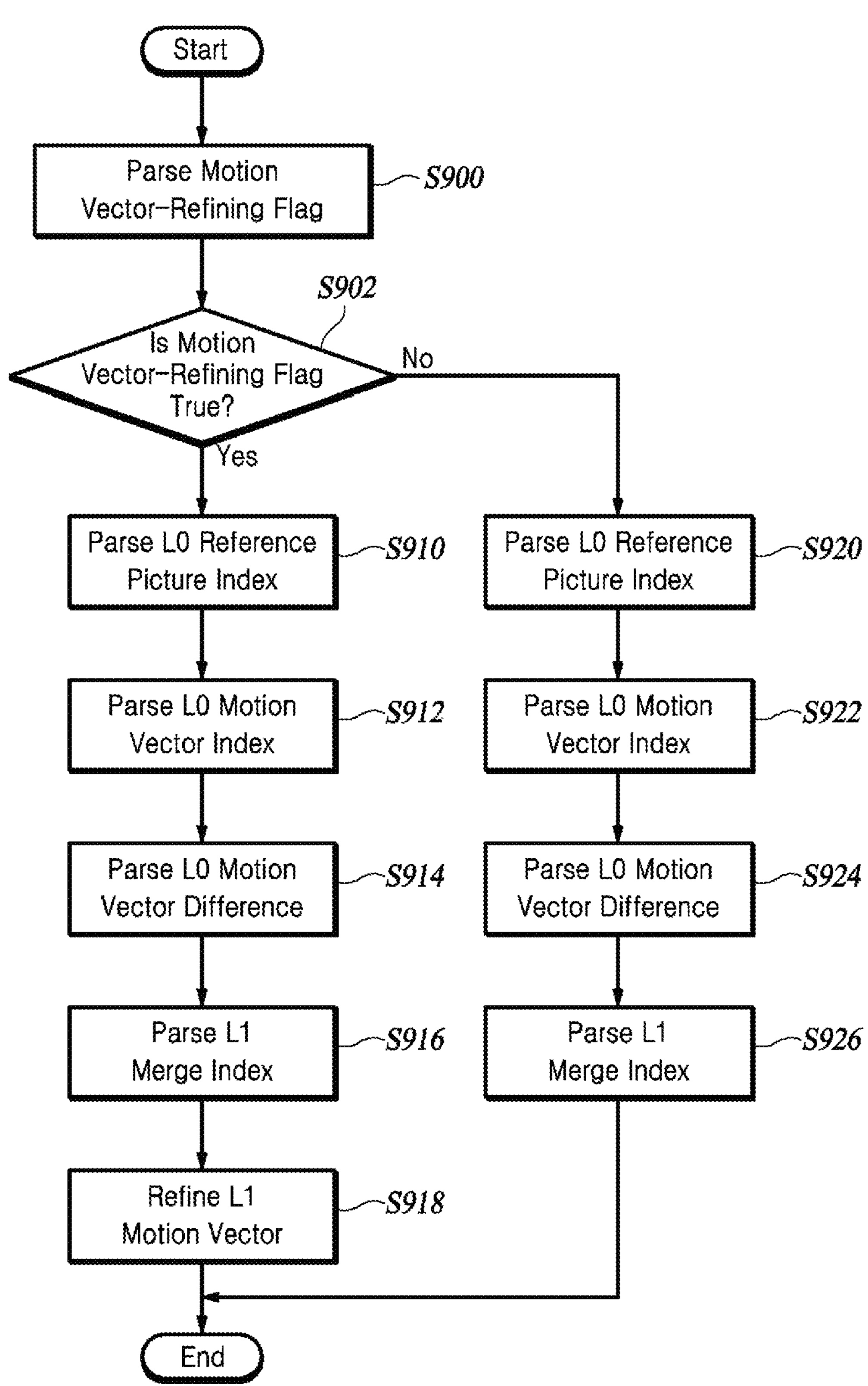
FIGS. 9A and 9B are flowcharts illustrating the parsing of motion vector differences and refinement of motion vectors, according to at least one embodiment of the present disclosure.
Figure 9B:
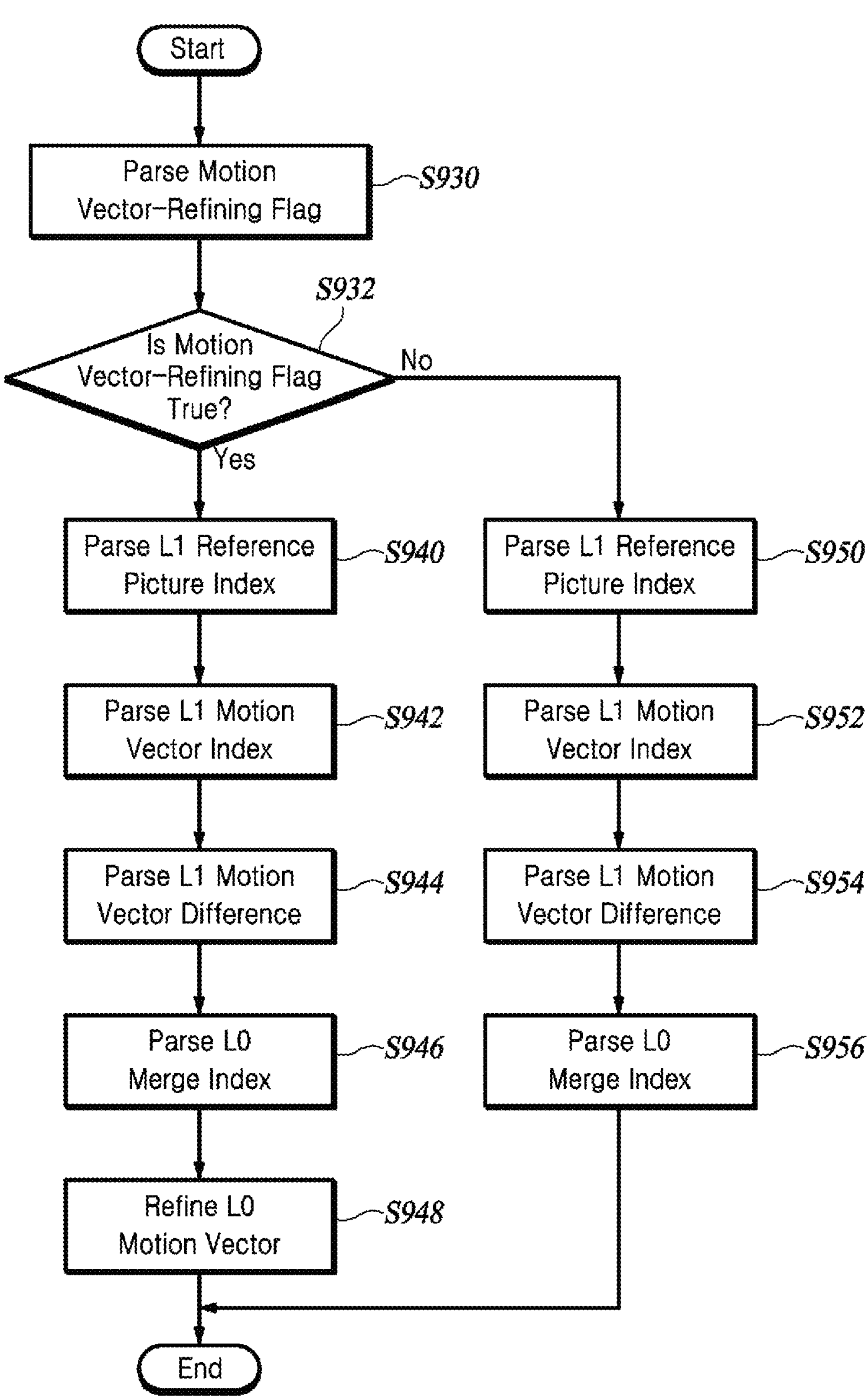

FIGS. 9A and 9B are flowcharts illustrating the parsing of motion vector differences and refining of motion vectors, according to at least one embodiment of the present disclosure.

In one example, when the current block is predicted according to inter-prediction mode and bi-directional prediction, prediction in one direction may be performed in merge mode and prediction in the other direction may be performed in AMVP mode. Here, with the prediction in the other direction performed in AMVP mode, the video decoding device may parse the index of the reference picture list and the motion vector difference. The video encoding device may determine and signal these information items to the video decoding device in terms of optimizing the coding efficiency.

As another example, the video decoding device may parse the motion vector difference and may refine the motion vector, as shown in the example of FIG. 9A or FIG. 9B. In the example of FIG. 9A, the L0 motion vector difference predicted in AMVP mode is parsed and the L1 motion vector predicted in merge mode is refined. In the example of FIG. 9B, the L1 motion vector difference predicted in AMVP mode is parsed and the L0 motion vector predicted in merge mode is refined. Meanwhile, a prior arrangement between the video encoding device and the video decoding device may determine which one of the methods illustrated in FIGS. 9A and 9B is to be used. Alternatively, the video encoding device may signal information to the video decoding device indicating which of the methods illustrated in FIGS. 9A and 9B to be used.

In the following, parsing of motion vector differences and refining of motion vectors are described by only using the example of FIG. 9A. Comparing to FIG. 9A, the L1 picture index, the L1 motion vector index, and the L1 motion vector difference in AMVP mode are parsed (S940-S944, S950-S954), the L0 merge index is parsed (S946, S956) to predict the L0 motion vector in merge mode, and the L0 motion vector is refined (S948) as shown in FIG. 9B. The remaining steps (S930-S932) of FIG. 9B are equivalent to the corresponding steps of FIG. 9A. Thus, the detailed description of FIG. 9B is omitted.

The video decoding device may parse the motion vector refinement flag indicating the refinement of the motion vector (S900), may check the motion vector refinement flag (S902), may parse the motion vector difference according to the flag's value, and may refine the motion vector.

If the motion vector-refining flag is true (Yes in S902), the following steps are performed.

The video decoding device parses the L0 reference picture index and the L0 motion vector index (S910, S912). The video decoding device parses the L0 motion vector difference (S914). The video decoding device parses the L1 merge index (S916). The video decoding device uses these parsed information items to generate the L0 motion vector predictor and the L1 motion vector. The video decoding device uses the L0 motion vector difference to refine the L1 motion vector (S918). Further, the video decoding device may sum the L0 motion vector predictor and the L0 motion vector difference to generate the L0 motion vector.

If the motion vector-refining flag is false (No in S902), the following steps are performed.

The video decoding device parses the L0 reference picture index and the L0 motion vector index (S920, S922). The video decoding device parses the L0 motion vector difference (S924). The video decoding device parses the L1 merge index (S926). The video decoding device uses these parsed information items to generate the L0 motion vector predictor and the L1 motion vector. The video decoding device may then sum the L0 motion vector predictor and the L0 motion vector difference to generate the L0 motion vector.

In one example, when bi-directional prediction is performed, the video decoding device may weight-sum the predictors according to the bi-directional motion vectors. The video decoding device may parse a flag indicating the weighted-sum and, if the flag is 1, parse the weights of each predictor. The video decoding device may then use the parsed weights to generate the final predictor for the current block. The video encoding device may determine and signal the flag and weights to the video decoding device in terms of optimizing the coding efficiency. The weights may exist in the form of a lookup table (LUT) based on an agreement between the video encoding device and the video decoding device, and the video encoding device may communicate the weights by signaling an index in the table to the video decoding device.

Figure 10A:
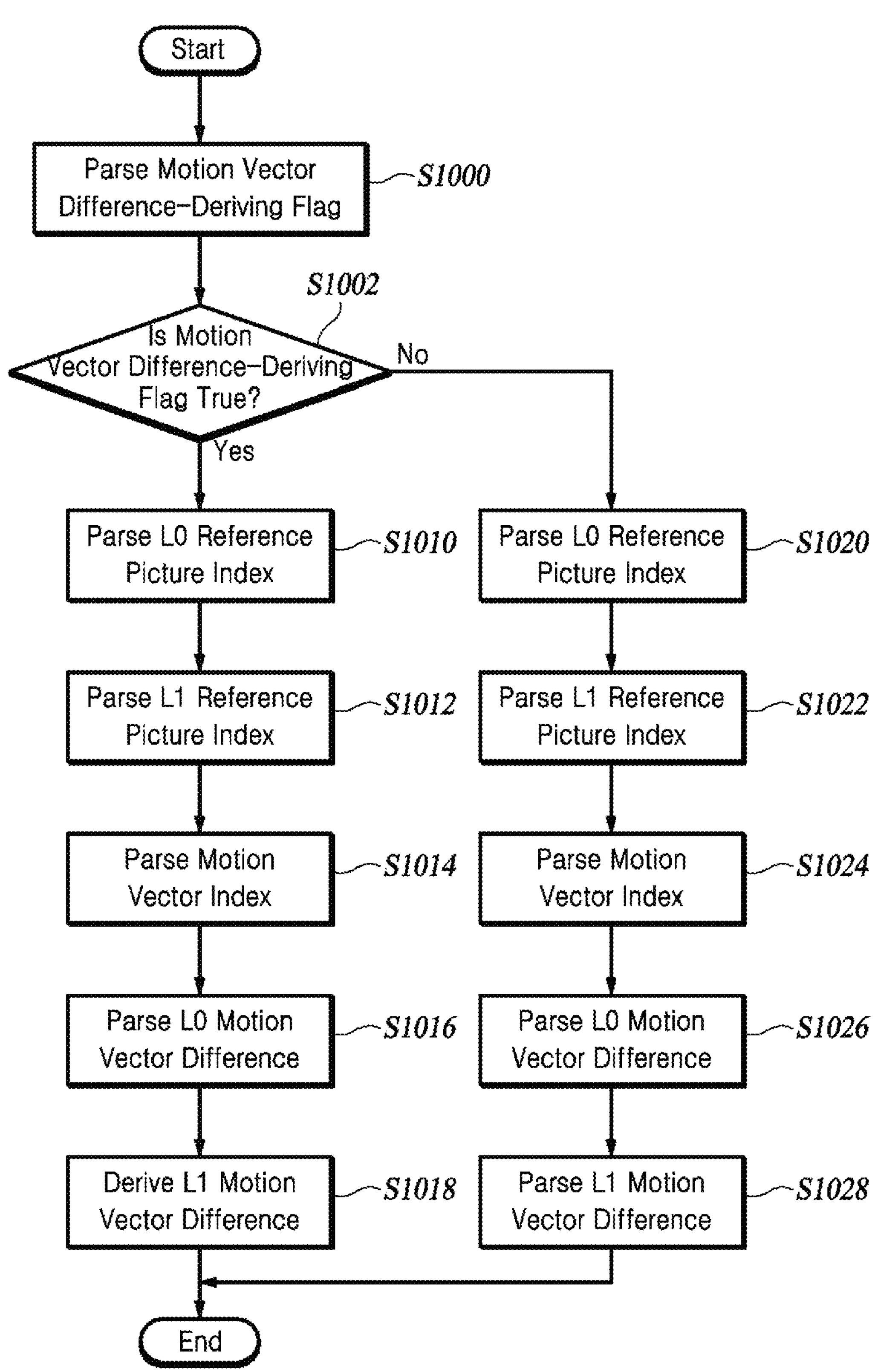
FIGS. 10A and 10B are flowcharts illustrating the parsing and derivation of motion vector differences, according to another embodiment of the present disclosure.
Figure 10B:
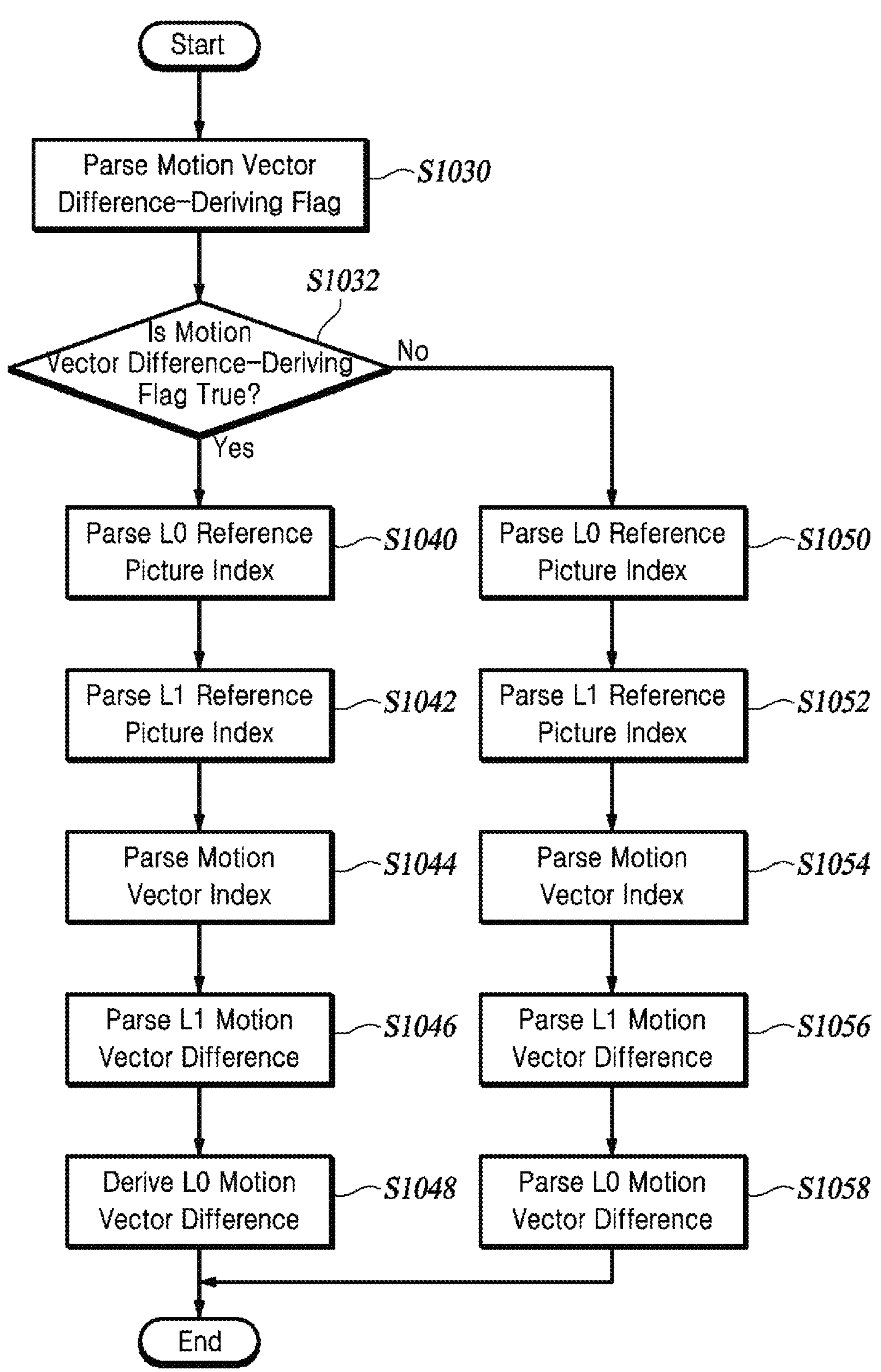

FIGS. 10A and 10B are flowcharts illustrating the parsing and derivation of motion vector differences, according to another embodiment of the present disclosure.

As yet another example, a video decoding device may parse and derive motion vector differences, as shown in the example of FIG. 10A or FIG. 10B. In the example of FIG. 10A, the L0 motion vector difference is parsed, and the L1 motion vector difference is derived. In the example of FIG. 10B, the L1 motion vector difference is parsed and the L0 motion vector difference is derived. Further, in the examples of FIGS. 10A and 10B, the video decoding device parses the motion vector index before parsing and deriving the motion vector differences. In the meantime, a prior arrangement between the video encoding device and the video decoding device may determine which one of the methods illustrated in FIGS. 10A and 10B is to be used. Alternatively, the video encoding device may signal information to the video decoding device indicating which of the methods illustrated in FIGS. 10A and 10B to use.

Hereinafter, parsing and derivation of motion vector differences are described by only using the example of FIG. 10A. Comparing to FIG. 10A, the L1 motion vector difference is parsed (S1046) and the L0 motion vector difference is derived (S1048) as shown in FIG. 10B. The other steps rather than S1046 and S1048 of FIG. 10B are equivalent to the corresponding steps of FIG. 10A. Thus, the detailed description of FIG. 10B is omitted.

The video decoding device may parse the motion vector difference-derivation flag indicating the derivation of the motion vector differences (S1000), may check the motion vector difference-derivation flag (S1002), and may parse and derive the motion vector differences according to the flag's value.

If the motion vector difference-derivation flag is true (Yes in S1002), the following steps are performed.

The video decoding device parses the L0, L1 reference picture indices (S1010, S1012). The video decoding device parses the motion vector indices (S1014) and uses the parsed motion vector indices to generate motion vector predictors. The video decoding device parses the L0 motion vector difference (S1016) and uses the parsed motion vector difference to derive the L1 motion vector difference (S1018). The video decoding device may then sum the motion vector predictors and the motion vector differences to finally generate bi-directional motion vectors.

If the motion vector difference-derivation flag is false (No in S1002), the following steps are performed.

The video decoding device parses the L0, L1 reference picture indices (S1020, S1022). The video decoding device parses the motion vector indices (S1024) and uses the parsed motion vector indices to generate motion vector predictors. The video decoding device parses the L0 and L1 motion vector differences (S1026, S1028). The video decoding device may then sum the motion vector predictors and the motion vector differences to finally generate bi-directional motion vectors.

In the following, the bi-directional reference pictures include an L0 reference picture and an L1 reference picture. The bi-directional motion vectors include an L0 motion vector (L0_MV) and an L1 motion vector (L1_MV). The L0 motion vector includes a horizontal L0 motion vector (L0_MV_x) and a vertical L0 motion vector (L0_MV_y), and the L1 motion vector includes a horizontal L1 motion vector (L1_MV_x) and a vertical L1 motion vector (L1_MV_y). Further, the L0 motion vector difference includes a horizontal L0 motion vector difference (L0_MVD_x) and a vertical L0 motion vector difference (L0_MVD_y), and the L1 motion vector difference includes a horizontal L1 motion vector difference (L1_MVD_x) and a vertical L1 motion vector difference (L1_MVD_y).

The video decoding device may derive the motion vector difference as follows.

In an example, it is assumed that prediction is performed in bi-directional prediction and AMVP mode, as in the example of FIG. 8A, but motion vector differences are first derived, and then motion vector indices are parsed. If the motion vector difference-derivation flag is true, the video decoding device first parses the L0 motion vector difference. Then, the video decoding device may derive the horizontal and vertical L1 motion vector differences to have the same magnitude as and opposite sign to those of the horizontal and vertical L0 motion vector differences.

In another example, it is assumed that prediction is performed in bi-directional prediction and AMVP mode, as in the example of FIG. 10A, but motion vector indices are first parsed and then motion vector differences are derived.

If the motion vector difference-derivation flag is true, the video decoding device first parses the L0 motion vector difference. Then, the video decoding device may use the horizontal and vertical L0 motion vector differences, the signs of the horizontal and vertical L0 motion vectors, and the signs of the horizontal and vertical L1 motion vectors to derive the horizontal and vertical L1 motion vector differences as follows.

If the sign of the vertical L0 motion vector is the same as the sign of the vertical L1 motion vector, the vertical L1 motion vector difference may be derived as the same value as the vertical L0 motion vector difference. The horizontal L1 motion vector difference may be derived in the same manner as described above.

On the other hand, if the sign of the vertical L0 motion vector is different from the sign of the vertical L1 motion vector, the vertical L1 motion vector difference may be derived to have the same magnitude as and opposite sign to those of the vertical L0 motion vector difference. The horizontal L1 motion vector difference may be derived in the same manner as described above.

As yet another example, for the parsed L0 motion vector difference, if POC_L0 is less than POC_curr and POC_L1 is greater than POC_curr, the video decoding device may derive the horizontal and vertical L1 motion vector differences as follows. Here, POC_L0 represents the picture order count (POC) of the L0 reference picture, POC_L1 represents the POC of the L1 reference picture, and POC_curr represents the POC of the current picture.

Using the difference between the current picture's POC and the L0 reference picture's POC, and the difference between the current picture's POC and the L1 reference picture's POC, the video decoding device derives a scaling factor $\alpha$ as shown in Equation 1.

$$\alpha = \left|\frac{POC\_L1 - POC\_curr}{POC\_curr - POC\_L0}\right| \qquad \text{Equation 1}$$

The video decoding device may then derive the horizontal and vertical L1 motion vector differences (L1_MVD_x and L1_MVD_y) from the horizontal and vertical L0 motion vector differences (L0_MVD_x and L0_MVD_y) according to Equation 2.

$$L1\_MVD\_x = -\text{round}(\alpha \times L0\_MVD\_x) \qquad \text{Equation 2}$$
$$L1\_MVD\_y = -\text{round}(\alpha \times L0\_MVD\_y)$$

Alternatively, using the scaling factor according to Equation 1, the horizontal and vertical L1 motion vector differences may be derived as follows. First, to each of the value of the L0 motion vector difference multiplied by the scaling factor and the value of the L0 motion vector difference not multiplied by the scaling factor, the video decoding device applies the horizontal and vertical sign combinations of (+, +), (+, −), (−, +), and (−, −), respectively, and thereby generates sixteen difference candidates. By further including the zero motion vector difference to the sixteen difference candidates, the video decoding device generates a total of seventeen candidates as shown in Equation 3, and generates a candidate group that includes these candidates.

$$A = (-\text{round}(\alpha \times L0\_MVD\_x), -\text{round}(\alpha \times L0\_MVD\_y)) \qquad \text{Equation 3}$$
$$B = (\text{round}(\alpha \times L0\_MVD\_x), -\text{round}(\alpha \times L0\_MVD\_y))$$
$$C = (\text{round}(\alpha \times L0\_MVD\_x), \text{round}(\alpha \times L0\_MVD\_y))$$
$$D = (-\text{round}(\alpha \times L0\_MVD\_x), \text{round}(\alpha \times L0\_MVD\_y))$$
$$E = (-L0\_MVD\_x, -\text{round}(\alpha \times L0\_MVD\_y))$$
$$F = (L0\_MVD\_x, -\text{round}(\alpha \times L0\_MVD\_y))$$
$$G = (L0\_MVD\_x, \text{round}(\alpha \times L0\_MVD\_y))$$
$$H = (-L0\_MVD\_x, \text{round}(\alpha \times L0\_MVD\_y))$$
$$I = (-\text{round}(\alpha \times L0\_MVD\_x), -L0\_MVD\_y)$$
$$J = (\text{round}(\alpha \times L0\_MVD\_x), -L0\_MVD\_y)$$
$$K = (\text{round}(\alpha \times L0\_MVD\_x), L0\_MVD\_y)$$
$$L = (-\text{round}(\alpha \times L0\_MVD\_x), L0\_MVD\_y)$$
$$M = (-L0\_MVD\_x, -L0\_MVD\_y)$$
$$N = (L0\_MVD\_x, -L0\_MVD\_y)$$
$$O = (L0\_MVD\_x, L0\_MVD\_y)$$
$$P = (-L0\_MVD\_x, L0\_MVD\_y)$$
$$Q = (0, 0)$$

Figure 11:
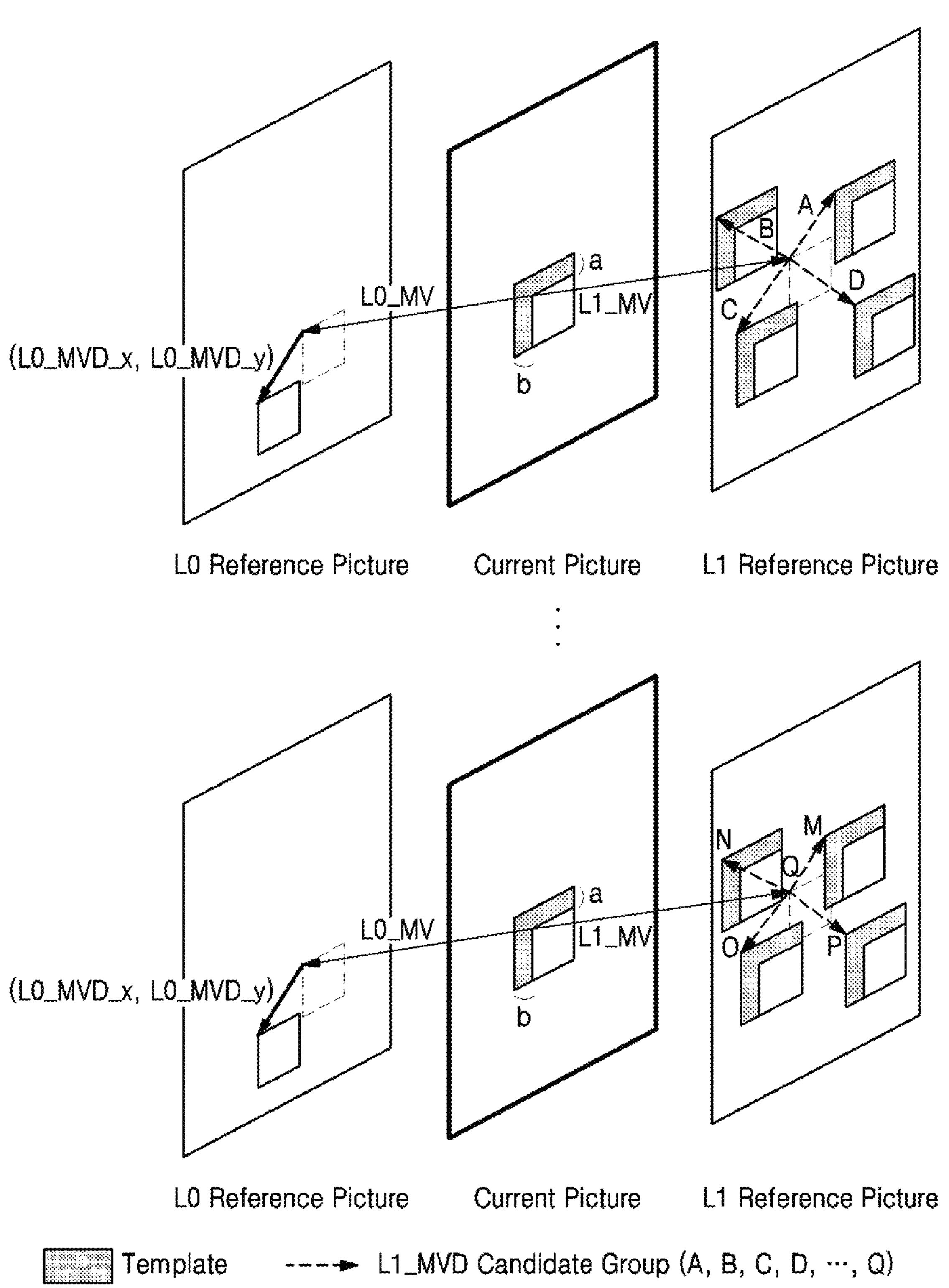
FIG. 11 is a diagram illustrating template matching-based derivation of motion vector differences, according to at least one embodiment of the present disclosure.

As shown in the example of FIG. 11, the video decoding device may derive, from the candidate group, candidates having regions similar to the template region of the current block based on template matching, as the horizontal and vertical L1 motion vector differences. Here, the template matching may compute, for each candidate-based reference block in the L1 reference picture, a loss function between a previously reconstructed neighboring template region of the current block and a template region around the reference block.

In one example, the video encoding device arranges the difference candidates in order of increasing loss value based on template matching and obtains an index of the first candidate. Further, the video encoding device calculates an index of the candidate having the least loss from the current block among the reference blocks obtained by using the candidates. The video decoding device may signal to the video decoding device a difference value between the index of the first candidate and the index of the candidate with the least loss. The video decoding device parses the index and arranges the candidates in order of increasing loss based on template matching. The video decoding device then adds the parsed index to the index of the first candidate among the arranged candidates and thereby calculates the index of the candidate with the least loss from the current block. The video decoding device may then derive the value of that candidate as the L1 motion vector difference.

Alternatively, the video encoding device may not perform template matching and may signal to the video decoding device the index of the candidate with the least loss from the current block. Here, the candidate index indicates the candidate with the least loss from the current block among the reference blocks obtained by using the difference candidates. The video decoding device may derive the motion vector difference corresponding to the parsed index to be the L1 motion vector difference.

When the derived scaling factor is 1, for the four candidates with the horizontal and vertical sign combinations of (+, +), (+, −), (−, +), and (−, −), the video decoding device may perform the process described above to derive the L1 motion vector difference.

Alternatively, for some of the seventeen candidates, the video decoding device may perform the process described above to derive the L1 motion vector difference.

The difference candidates are not limited to the seventeen presented in Equation 3. For example, after adding other candidates to the seventeen presented in Equation 3, the video decoding device may perform the process described above to derive the L1 motion vector difference. Alternatively, after generating candidates that are different from the seventeen candidates presented in Equation 3, the video decoding device may perform the process described above to derive the L1 motion vector difference.

Further, in the example of FIG. 11, for the previously reconstructed neighboring template regions of the current block, the values of a, b may have a fixed size or may have an adaptive size to the size of the current block. As a loss function for finding a similar region based on template matching, the present disclosure may use an mean square error (MSE), a sumof absolute differences (SAD) between brightness values, or the like.

Meanwhile, after the scaling factor $\alpha$ is derived, the video encoding device generates candidate horizontal scaling factors and candidate vertical scaling factors ($\beta_x$, $\beta_y$) ($\beta_x$, $\beta_y \in \{\alpha-\gamma, \alpha, \alpha+\gamma, 0\}$). Then, the video encoding device may use the candidate horizontal scaling factors, the candidate vertical scaling factor candidates, and the L0 motion vector difference to derive horizontal and vertical L1 motion vector differences. Here, the horizontal scaling factor and vertical scaling factor are expressed as $\beta_x(0)=\beta_y(0)=\alpha-\gamma$, $\beta_x(1)=\beta_y(1)=\alpha$, $\beta_x(2)=\beta_y(2)=\alpha+\gamma$, and $\beta_x(3)=\beta_y(3)=0$. Additionally, a fixed value of $\gamma$ may be used, and if the scaling factor $\alpha$ is not 1, $\gamma$ may be derived as shown in Equation 4 based on the ratio of the POC (picture order count) values.

$$\gamma = \frac{1}{|2 \times POC\_curr - POC\_L0 - POC\_L1| + 1} \qquad \text{Equation 4}$$

In one example, the horizontal and vertical L1 motion vector differences may be opposite in sign to the horizontal and vertical L0 motion vector differences. Alternatively, the horizontal and vertical L1 motion vector differences may be derived by using the signs of the horizontal and vertical L0 motion vectors and the horizontal and vertical L1 motion vectors. For example, in terms of coding efficiency, the video encoding device may calculate, for candidate horizontal and vertical scaling factors, an index pair (p,q) indicative of optimal horizontal and vertical scaling factors and may signal the index pair (p,q) to the video decoding device. The video decoding device may parse the index pair and, by using the parsed index pair and the already parsed L0 motion vector difference, may derive the L1 motion vector difference as shown in Equation 5.

$$L1\_MVD\_x = -\text{round}(\beta_x(p) \times L0\_MVD\_x) \text{ or} \qquad \text{Equation 5}$$
$$L1\_MVD\_x = \text{round}(\beta_x(p) \times L0\_MVD\_x),$$
$$L1\_MVD\_y = -\text{round}(\beta_y(q) \times L0\_MVD\_y) \text{ or}$$
$$L1\_MVD\_y = \text{round}(\beta_y(q) \times L0\_MVD\_y)$$

Alternatively, the video encoding device may perform template matching on the candidate horizontal and vertical scaling factors to calculate a horizontal and vertical scaling factor pair ($\beta_x(p)$, $\beta_y(q)$) of the candidate with an optimal loss value, and may signal the corresponding index pair (p, q) to the video decoding device. The video decoding device may parse the index pair, and may use the parsed index pair and the L0 motion vector difference to derive the L1 motion vector difference as shown in Equation 5. As described above, the template matching may compute, for each candidate-based reference block in the L1 reference picture, the loss function between the previously reconstructed neighboring template region of the current block and the template region around the reference block in the L1 reference picture.

Alternatively, among all the candidates resulting from applying the candidate horizontal and vertical scaling factors to the magnitude of the L0 motion vector difference value for all horizontal and vertical sign combinations, the video encoding device may calculate indices of the signs and the scaling factors having the optimal combination and then may signal the calculated indices to the video decoding device. In some embodiments, the indices of the respective combinations of signs and scaling factors may exist in the form of an LUT based on an agreement between the video encoding device and the video decoding device, and the video encoding device may deliver the optimal combination of signs and scaling factors by signaling the indices in the relevant table to the video decoding device. The video decoding device may parse the indices, and may use the parsed indices and the L0 motion vector difference to derive the L1 motion vector difference, as shown in Equation 5.

As yet another example, for the parsed L0 motion vector difference, if POC_L0 and POC_L1 are less than POC_curr, the video decoding device may derive the horizontal and vertical L1 motion vector differences as follows.

Using the difference between the POC of the current picture and the POC of the L0 reference picture, and the difference between the POC of the current picture and the POC of the L1 reference picture, the video decoding device derives a scaling factor $\alpha$ as shown in Equation 1. Then, the video decoding device may derive the horizontal and vertical L1 motion vector differences (L1_MVD_x and L1_MVD_y) from the horizontal and vertical L0 motion vector differences (L0_MVD_x and L0_MVD_y) according to Equation 6.

$$L1\_MVD\_x = \text{round}(\alpha \times L0\_MVD\_x) \qquad \text{Equation 6}$$
$$L1\_MVD\_y = \text{round}(\alpha \times L0\_MVD\_y)$$

Alternatively, using the scaling factor according to Equation 1, the horizontal and vertical L1 motion vector differences may be derived as follows. First, the video decoding device generates sixteen difference candidates by applying the horizontal and vertical sign combinations of (+, +), (+, −), (−, +), and (−, −), respectively, to the magnitude of the L0 motion vector difference multiplied by the scaling factor and without the scaling factor multiplied. By further including the zero motion vector difference to the sixteen difference candidates, the video decoding device generates a total of seventeen candidates as shown in Equation 3, and generates a candidate group that includes these candidates.

Figure 12:
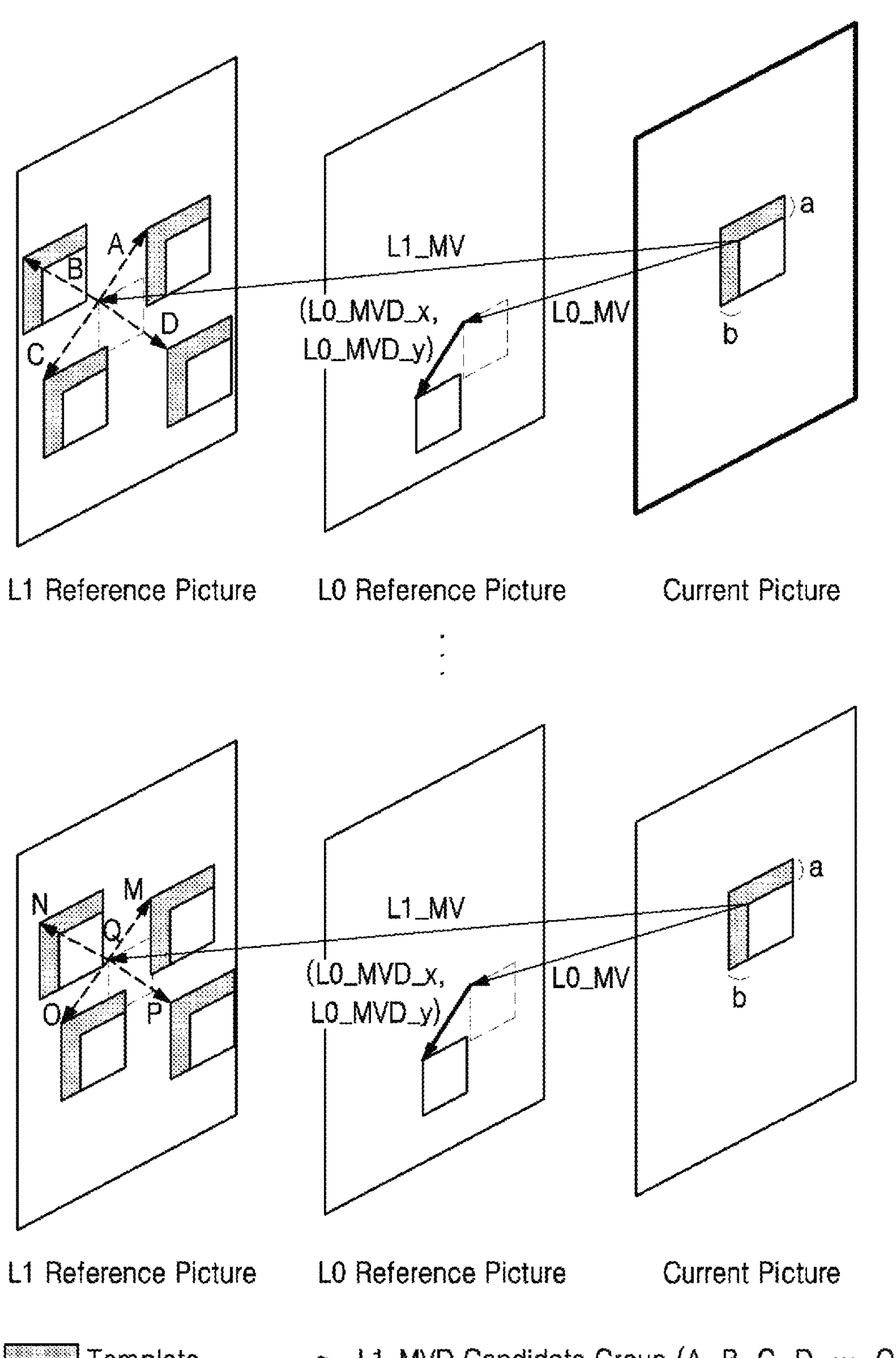
FIG. 12 is a diagram illustrating template matching-based derivation of motion vector differences, according to another embodiment of the present disclosure.

As shown in the example of FIG. 12, the video decoding device may derive from the candidate group a candidate having a region similar to the template region of the current block based on template matching, as the L1 motion vector difference. As described above, the template matching may compute, for each candidate-based reference block in the L1 reference picture, the loss function between the previously reconstructed neighboring template region of the current block and the template region around the reference block.

In one example, the video encoding device arranges the candidates in order of increasing loss value based on template matching and obtains an index of the first candidate. Further, the video encoding device calculates an index of the candidate having the least loss from the current block among the reference blocks obtained by using the candidates. The video decoding device may signal to the video decoding device a difference value between the index of the first candidate and the index of the candidate with the least loss. The video decoding device parses that index and arranges the candidates in order of increasing loss based on template matching. The video decoding device then adds the parsed index to the index of the first candidate among the arranged candidates to calculate the index of the candidate with the least loss from the current block. The video decoding device may then derive the value of that candidate as the L1 motion vector difference.

Alternatively, the video encoding device may not perform template matching and may signal to the video decoding device the index of the candidate with the least loss from the current block. Here, candidate index indicates the candidate with the least loss from the current block among the reference blocks obtained by using the difference candidates. The video decoding device may derive the motion vector difference corresponding to the parsed index to be the L1 motion vector difference.

When the derived scaling factor is 1, the video decoding device may derive the L1 motion vector difference by performing the process described above for the four candidates with the horizontal and vertical sign combinations of (+, +), (+, −), (−, +), and (−, −).

Alternatively, for some of the seventeen candidates, the video decoding device may perform the process described above to derive the L1 motion vector difference.

The difference candidates are not limited to the seventeen presented in Equation 3. For example, after adding other candidates to the seventeen presented in Equation 3, the video decoding device may perform the process described above to derive the L1 motion vector difference. Alternatively, after generating candidates that are different from the seventeen candidates presented in Equation 3, the video decoding device may perform the process described above to derive the L1 motion vector difference.

Further, in the example of FIG. 12, for the previously reconstructed neighboring template regions of the current block, the values of a, b may have a fixed size or may have an adaptive size to the size of the current block. As a loss function for finding a similar region based on template matching, the present disclosure may use an MSE, a SAD between brightness values, or the like.

Meanwhile, after the scaling factor $\alpha$ is derived, the video encoding device generates candidate horizontal scaling factors and candidate vertical scaling factors $(\beta_x, \beta_y)$ $(\beta_x, \beta_y \in \{\alpha-\gamma, \alpha, \alpha+\gamma, 0\})$. Then, the video encoding device may use the candidate horizontal scaling factors, the candidate vertical scaling factor candidates, and the L0 motion vector difference to derive horizontal and vertical L1 motion vector differences. Here, the horizontal scaling factor and vertical scaling factor are expressed as $\beta_x(0)=\beta_y(0)=\alpha-\gamma$, $\beta_x(1)=\beta_y(1)=\alpha$, $\beta_x(2)=\beta_y(2)=\alpha+\gamma$, and $\beta_x(3)=\beta_y(3)=0$. Additionally, a fixed value of $\gamma$ may be used, and if the scaling factor $\alpha$ is not 1, $\gamma$ may be derived as shown in Equation 7 based on the ratio of the POC values.

$$\gamma = \frac{1}{|POC\_L0 - POC\_L1| + 1} \quad \text{Equation 7}$$

In one example, the horizontal and vertical L1 motion vector differences may be equal in sign to the horizontal and vertical L0 motion vector differences. Alternatively, the horizontal and vertical L1 motion vector differences may be derived by using the signs of the horizontal and vertical L0 motion vectors and the horizontal and vertical L1 motion vectors. For example, in terms of coding efficiency, the video encoding device may calculate, for candidate horizontal and vertical scaling factors, an index pair (p,q) indicative of optimal horizontal and vertical scaling factors and may signal the index pair (p,q) to the video decoding device. The video decoding device may parse the index pair and, by using the parsed index pair and the already parsed L0 motion vector difference, may derive the L1 motion vector difference as shown in Equation 8.

$$L1\_MVD\_x = -\text{round}(\beta_x(p) \times L0\_MVD\_x) \text{ or } L1\_MVD\_x = \text{round}(\beta_x(p) \times L0\_MVD\_x), \quad L1\_MVD\_y = -\text{round}(\beta_y(q) \times L0\_MVD\_y) \text{ or } L1\_MVD\_y = \text{round}(\beta_y(q) \times L0\_MVD\_y) \quad \text{Equation 8}$$

Alternatively, the video encoding device may perform template matching on the candidate horizontal and vertical scaling factors to calculate a horizontal and vertical scaling factor pair $(\beta_x(p), \beta_y(q))$ of the candidate with an optimal loss value, and may signal the corresponding index pair (p, q) to the video decoding device. The video decoding device may parse the index pair, and may use the parsed index pair and the L0 motion vector difference to derive the L1 motion vector difference as shown in Equation 8. As described above, the template matching may compute, for each candidate-based reference block in the L1 reference picture, the loss function between the previously reconstructed neighboring template region of the current block and the template region around the reference block in the L1 reference picture.

Alternatively, among all the candidates resulting from applying the candidate horizontal and vertical scaling factors to the magnitude of the L0 motion vector difference value for all horizontal and vertical sign combinations, the video encoding device may calculate indices of the signs and the scaling factors having the optimal combination and then may signal the calculated indices to the video decoding device. In some embodiments, the indices of the respective combinations of signs and scaling factors may exist in the form of an LUT based on an agreement between the video encoding device and the video decoding device, and the video encoding device may deliver the optimal combination of signs and scaling factors by signaling the indices in the relevant table to the video decoding device. The video decoding device may parse the indices, and may use the parsed indices and the L0 motion vector difference to derive the L1 motion vector difference, as shown in Equation 8.

When the L1 motion vector difference is parsed according to the example of FIG. 8B or FIG. 10B, the video decoding device may utilize the same process as described above to derive the L0 motion vector difference.

The video decoding device may refine the motion vector as follows.

As in the example of FIG. 9A, it is assumed to perform a bi-directional prediction with the L0 direction using the AMVP mode and the L1 direction using the merge mode. If the motion vector-refining flag is true, the video decoding device first parses the L0 motion vector difference. Then, the video decoding device may refine the L1 motion vector (L1_MV) as follows.

In one example, upon detecting the parsed L0 motion vector difference (L0_MVD), if POC_L0 is less than POC_curr and POC_L1 is greater than POC_curr, the video decoding device may refine the horizontal and vertical L1 motion vectors (L1_MV_x, L1_MV_y) as follows. As described above, POC_L0 represents the POC (picture order count) of the L0 reference picture, POC_L1 represents the POC of the L1 reference picture, and POC_curr represents the POC of the current picture.

Using the difference between the current picture's POC and the L0 reference picture's POC, and the difference between the current picture's POC and the L1 reference picture's POC, the video decoding device derives a scaling factor $\alpha$ as shown in Equation 1. To each of the value of the L0 motion vector difference multiplied by the scaling factor and the value of the L0 motion vector difference not multiplied by the scaling factor, the video decoding device applies the horizontal and vertical sign combinations of (+, +), (+, −), (−, +), and (−, −), respectively, and thereby generates sixteen difference candidates. By further including the zero motion vector difference to the sixteen difference candidates, the video decoding device generates a total of seventeen candidates as shown in Equation 3, and generates a candidate group that includes these candidates.

As shown in the example of FIG. 11, the video decoding device may use, from the candidate group, a candidate having a region similar to the template region of the current block based on template matching, as a refining value. As described above, the template matching may compute, for each candidate-based reference block in the L1 reference picture, the loss function between the previously reconstructed neighboring template region of the current block and the template region around the reference block. The video decoding device may apply the refining value to the horizontal and vertical L1 motion vector components (L1_MV_x, L1_MV_y) according to the merge index to refine the L1 motion vector.

In one example, the video encoding device arranges the candidates in order of increasing loss value based on template matching and obtains an index of the first candidate. Further, the video encoding device calculates an index of the candidate having the least loss from the current block among the reference blocks obtained by using the candidates. The video decoding device may signal to the video decoding device a difference value between the index of the first candidate and the index of the candidate with the least loss. The video decoding device parses that index and arranges the candidates in order of increasing loss based on template matching. The video decoding device then adds the parsed index to the index of the first candidate among the arranged candidates to calculate the index of the candidate with the least loss from the current block. The video decoding device may then derive the value of that candidate as the L1 motion vector difference.

Alternatively, the video encoding device may not perform template matching and may signal to the video decoding device the index of the candidate with the least loss from the current block. The video decoding device may use the motion vector difference corresponding to the parsed index to refine the L1 motion vector.

Meanwhile, after the scaling factor $\alpha$ is derived, the video encoding device generates candidate horizontal scaling factors and candidate vertical scaling factors $(\beta_x, \beta_y)$ $(\beta_x, \beta_y \in \{\alpha-\gamma, \alpha, \alpha+\gamma, 0\})$. Then, the video encoding device may use the candidate horizontal scaling factors, the candidate vertical scaling factor candidates, and the L0 motion vector difference to derive horizontal and vertical L1 motion vector differences. Here, the horizontal scaling factor and vertical scaling factor are expressed as $\beta_x(0)=\beta_y(0)=\alpha-\gamma$, $\beta_x(1)=\beta_y(1)=\alpha$, $\beta_x(2)=\beta_y(2)=\alpha+\gamma$, and $\beta_x(3)=\beta_y(3)=0$. Additionally, a fixed value of $\gamma$ may be used, and if the scaling factor $\alpha$ is not 1, $\gamma$ may be derived as shown in Equation 4 based on the ratio of the POC values.

In one example, the refining values of the horizontal and vertical L1 motion vectors may be opposite in sign to the horizontal and vertical L0 motion vector differences. Alternatively, the refining values of the horizontal and vertical L1 motion vectors may be derived by using the signs of the horizontal and vertical L0 motion vectors and the horizontal and vertical L1 motion vectors. For example, in terms of coding efficiency, the video encoding device may calculate, for candidate horizontal and vertical scaling factors, an index pair (p,q) indicative of optimal horizontal and vertical scaling factors and may signal the index pair (p,q) to the video decoding device. The video decoding device may parse the index pair and, by using the parsed index pair and the already parsed L0 motion vector difference, may refine the L1 motion vector as shown in Equation 9.

Equation 9

$$L1\_MV\_x\_\text{refined} = L1\_MV\_x - \text{round}(\beta_x(p) \times L0\_MVD\_x) \text{ or}$$

$$L1\_MV\_x\_\text{refined} = L1\_MV\_x + \text{round}(\beta_x(p) \times L0\_MVD\_x),$$

$$L1\_MV\_y\_\text{refined} = L1\_MV\_y - \text{round}(\beta_y(q) \times L0\_MVD\_y) \text{ or}$$

$$L1\_MV\_y\_\text{refined} = L1\_MV\_y + \text{round}(\beta_y(q) \times L0\_MVD\_y)$$

Alternatively, the video encoding device may perform template matching on the candidate horizontal and vertical scaling factors to calculate a horizontal and vertical scaling factor pair $(\beta_x(p), \beta_y(q))$ of the candidate with an optimal loss value, and may signal the corresponding index pair (p, q) to the video decoding device. The video decoding device may parse the index pair, and may use the parsed index pair and the L0 motion vector difference to derive the L1 motion vector difference as shown in Equation 9. As described above, the template matching may compute, for each candidate-based reference block in the L1 reference picture, the loss function between the previously reconstructed neighboring template region of the current block and the template region around the reference block in the L1 reference picture.

Alternatively, among all the candidates resulting from applying the candidate horizontal and vertical scaling factors to the magnitude of the L0 motion vector difference value for all horizontal and vertical sign combinations, the video encoding device may calculate indices of the signs and the scaling factors having the optimal combination and may signal the calculated indices to the video decoding device. In some embodiments, the indices of the respective combinations of signs and scaling factors may exist in the form of an LUT based on an agreement between the video encoding device and the video decoding device, and the video encoding device may communicate the optimal combination of signs and scaling factors by signaling the indices in the table to the video decoding device. The video decoding device may parse the indices, and may use the parsed indices and the L0 motion vector difference to refine the L1 motion vector as shown in Equation 9.

As another example, upon detecting the parsed L0 motion vector difference (L0_MVD), if POC_L0 and POC_L1 are less than POC_curr, the video decoding device may refine the horizontal and vertical L1 motion vectors (L1_MV_x, L1_MV_y) as follows.

Using the difference between the POC of the current picture and the POC of the L0 reference picture, and the difference between the POC of the current picture and the POC of the L1 reference picture, the video decoding device derives a scaling factor $\alpha$ as shown in Equation 1. The video decoding device generates sixteen difference candidates by applying the horizontal and vertical sign combinations of (+, +), (+, −), (−, +), and (−, −), respectively, to the magnitude of the L0 motion vector difference multiplied by the scaling factor and without the scaling factor multiplied. By further including the zero motion vector difference to the sixteen difference candidates, the video decoding device generates a total of seventeen candidates as shown in Equation 3, and generates a candidate group that includes these candidates.

As shown in the example of FIG. 12, the video decoding device may use, from the candidate group, a candidate having a region similar to the template region of the current block based on template matching, as a refining value. As described above, the template matching may compute, for each candidate-based reference block in the L1 reference picture, the loss function between the previously reconstructed neighboring template region of the current block and the template region around the reference block. The video decoding device may apply the refining value to the horizontal and vertical L1 motion vector components (L1_MV_x, L1_MV_y) according to the merge index to refine the L1 motion vector.

In one example, the video encoding device arranges the candidates in order of increasing loss value based on template matching and obtains an index of the first candidate. Further, the video encoding device calculates an index of the candidate having the least loss from the current block among the reference blocks obtained by using the candidates. The video decoding device may signal to the video decoding device a difference value between the index of the first candidate and the index of the candidate with the least loss. The video decoding device parses that index and arranges the candidates in order of increasing loss based on template matching. The video decoding device then adds the parsed index to the index of the first candidate among the arranged candidates to calculate the index of the candidate with the least loss from the current block. The video decoding device may then use the value of that candidate to refine the L1 motion vector.

Alternatively, the video encoding device may not perform template matching and may signal to the video decoding device the index of the candidate with the least loss from the current block. The video decoding device may use the motion vector difference corresponding to the parsed index to refine the L1 motion vector.

Meanwhile, after the scaling factor $\alpha$ is derived, the video encoding device generates candidate horizontal scaling factors and candidate vertical scaling factors ($\beta_x$, $\beta_y$) ($\beta_x$, $\beta_y \in \{\alpha-\gamma, \alpha, \alpha+\gamma, 0\}$). Then, the video encoding device may use the candidate horizontal scaling factors, the candidate vertical scaling factor candidates, and the L0 motion vector difference to derive horizontal and vertical L1 motion vector differences. Here, the horizontal scaling factor and vertical scaling factor are expressed as $\beta_x(0)=\beta_y(0)=\alpha-\gamma$, $\beta_x(1)=\beta_y(1)=\alpha$, $\beta_x(2)=\beta_y(2)=\alpha+\gamma$, and $\beta_x(3)=\beta_y(3)=0$. Additionally, a fixed value of $\gamma$ may be used, and if the scaling factor $\alpha$ is not 1, $\gamma$ may be derived as shown in Equation 7 based on the ratio of the POC values.

In one example, the horizontal and vertical L1 motion vector differences may be equal in sign to the horizontal and vertical L0 motion vector differences. Alternatively, the horizontal and vertical L1 motion vector differences may be derived by using the signs of the horizontal and vertical L0 motion vectors and the horizontal and vertical L1 motion vectors. For example, in terms of coding efficiency, the video encoding device may calculate, for candidate horizontal and vertical scaling factors, an index pair (p,q) indicative of optimal horizontal and vertical scaling factors and signal the index pair (p,q) to the video decoding device. The video decoding device may parse the index pair and, by using the parsed index pair and the already parsed L0 motion vector difference, may derive the L1 motion vector difference as shown in Equation 10.

Equation 10

$$L1\_MV\_x\_\text{refined} = L1\_MV\_x - \text{round}(\beta_x(p) \times L0\_MVD\_x) \text{ or}$$
$$L1\_MV\_x\_\text{refined} = L1\_MV\_x + \text{round}(\beta_x(p) \times L0\_MVD\_x),$$
$$L1\_MV\_y\_\text{refined} = L1\_MV\_y - \text{round}(\beta_y(q) \times L0\_MVD\_y) \text{ or}$$
$$L1\_MV\_y\_\text{refined} = L1\_MV\_y + \text{round}(\beta_y(q) \times L0\_MVD\_y)$$

Alternatively, the video encoding device may perform template matching on the candidate horizontal and vertical scaling factors to calculate a horizontal and vertical scaling factor pair ($\beta_x$p), $\beta_y$(q)) of the candidate with an optimal loss value, and may signal the corresponding index pair (p, q) to the video decoding device. The video decoding device may parse the index pair, and may use the parsed index pair and the L0 motion vector difference to derive the L1 motion vector difference as shown in Equation 10. As described above, the template matching may compute, for each candidate-based reference block in the L1 reference picture, the loss function between the previously reconstructed neighboring template region of the current block and the template region around the reference block in the L1 reference picture.

Alternatively, among all the candidates resulting from applying the candidate horizontal and vertical scaling factors to the magnitude of the L0 motion vector difference value for all horizontal and vertical sign combinations, the video encoding device may calculate indices of the signs and the scaling factors having the optimal combination and then may signal them to the video decoding device. In some embodiments, the indices of the respective combinations of signs and scaling factors may exist in the form of an LUT based on an agreement between the video encoding device and the video decoding device, and the video encoding device may deliver the optimal combination of signs and scaling factors by signaling the indices in the relevant table to the video decoding device. The video decoding device may parse the indices, and may use the parsed indices and the L0 motion vector difference to refine the L1 motion vector, as shown in Equation 10.

When the L1 motion vector difference is parsed according to the example of FIG. 9B, the video decoding device may use the same process as described above to refine the L0 motion vector.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

The invention claimed is:

1. A method performed by a video decoding device for decoding a motion vector of a current block, the method comprising:

decoding, from a bitstream, reference picture indices that are in a bi-direction manner and are of the current block, indicating reference pictures that are in the bi-direction manner and comprise an LX reference picture, where X=0 or X=1, and an L1-X reference picture;

decoding, from the bitstream, motion vector indices that are in the bi-direction manner, indicating motion vectors that are in the bi-direction manner and comprise an LX motion vector and an L1-X motion vector, the LX motion vector comprising a horizontal LX motion vector and a vertical LX motion vector, the L1-X motion vector comprising a horizontal L1-X motion vector and a vertical L1-X motion vector;

decoding, from the bitstream, an LX motion vector difference that comprises a horizontal LX motion vector difference and a vertical LX motion vector difference; and deriving an L1-X motion vector difference by using the LX motion vector difference;

wherein the L1-X motion vector difference comprises a horizontal L1-X motion vector difference and a vertical L1-X motion vector difference;

wherein deriving the L1-X motion vector difference includes:

deriving a scaling factor by using a difference between a picture order count (POC) of a current picture and a POC of the LX reference picture, and a difference between a POC of the current picture and a POC of the L1-X reference picture; and calculating the horizontal L1-X motion vector difference and the vertical L1-X motion vector difference by using the scaling factor, the horizontal L1 motion vector difference, and the vertical LX motion vector difference.

2. The method of claim 1, further comprising:

decoding a motion vector difference-derivation flag; and checking the motion vector difference-derivation flag;

wherein when the motion vector difference-derivation flag is true, deriving the L1-X motion vector difference.

3. The method of claim 2, further comprising:

wherein when the motion vector difference-derivation flag is false, decoding the L1-X motion vector difference.

4. The method of claim 1, further comprising:

generating motion vector predictors that are in the bi-direction manner by using the motion vector indices that are in the bi-direction manner; and using the motion vector predictors that are in the bi-direction manner, the LX motion vector difference, and the L1-X motion vector difference to generate the motion vectors that are in the bi-direction manner.

5. The method of claim 1, wherein deriving the L1-X motion vector difference includes:

deriving the vertical L1-X motion vector difference from the vertical LX motion vector difference when the vertical LX motion vector is equal in sign to the vertical L1-X motion vector.

6. The method of claim 1, wherein deriving the L1-X motion vector difference further includes:

using the horizontal LX motion vector difference, the vertical LX motion vector difference, the scaling factor, and a combination of horizontal and vertical signs to generate a plurality of candidates.

7. The method of claim 6, wherein deriving the L1-X motion vector difference further includes:

deriving, from the plurality of candidates, a candidate having a region similar to a template region of the current block according to template matching to be the horizontal L1-X motion vector difference and the vertical L1-X motion vector difference;

wherein the template matching, when applied to a reference block that is contained in the L1-X reference picture and based on each of the candidates, calculates a loss function between a previously reconstructed neighboring template region of the current block and a template region around the reference block.

8. The method of claim 6, wherein deriving the L1-X motion vector difference further includes:

decoding a candidate index that indicates a candidate having a least loss from the current block among reference blocks obtained by using the plurality of candidates; and deriving a candidate indicated by the candidate index to be the horizontal L1-X motion vector difference and the vertical L1-X motion vector difference.

9. The method of claim 1, wherein deriving the L1-X motion vector difference further includes:

decoding an index pair indicating an optimal horizontal scaling factor and an optimal vertical scaling factor, wherein the optimal horizontal scaling factor and the optimal vertical scaling factor are selected from candidates of horizontal scaling factors and vertical scaling factors generated by using the scaling factor and a preset constant that is calculated based on the POC of the current picture, the POC of the LX reference picture, and the POC of the L1-X reference picture; and using horizontal and vertical scaling factors indicated by the index pair, the horizontal LX motion vector difference, and the vertical LX motion vector difference to derive the horizontal L1-X motion vector difference and the vertical L1-X motion vector difference.

10. The method of claim 1, wherein deriving the L1-X motion vector difference further includes:

decoding an index pair indicating an optimal horizontal scaling factor and an optimal vertical scaling factor, wherein the optimal horizontal scaling factor and the optimal vertical scaling factor are selected by applying template matching to candidates of horizontal scaling factors and vertical scaling factors generated by using the scaling factor and a preset constant that is calculated based on the POC of the current picture, the POC of the LX reference picture, and the POC of the L1-X reference picture, and wherein the template matching, when applied to a reference block that is contained in the L1-X reference picture and based on each of the candidates, calculates a loss function between a previously reconstructed neighboring template region of the current block and a template region around the reference block; and using horizontal and vertical scaling factors indicated by the index pair, the horizontal LX motion vector difference, and the vertical LX motion vector difference to derive the horizontal L1-X motion vector difference and the vertical L1-X motion vector difference.

11. A method performed by a video encoding device for encoding a motion vector of a current block, the method comprising:

determining reference picture indices that are in a bi-direction manner and are of the current block, indicating reference pictures that are in the bi-direction manner and comprise an LX reference picture, where X=0 or X=1, and an L1-X reference picture;

determining motion vector indices that are in the bi-direction manner, indicating motion vectors that are in the bi-direction manner and comprise an LX motion vector and an L1-X motion vector, the LX motion vector comprising a horizontal LX motion vector and a vertical LX motion vector, the L1-X motion vector comprising a horizontal L1-X motion vector and a vertical L1-X motion vector;

calculating an LX motion vector difference that comprises a horizontal LX motion vector difference and a vertical LX motion vector difference; and deriving an L1-X motion vector difference by using the LX motion vector difference, wherein the L1-X motion vector difference comprises a horizontal L1-X motion vector difference and a vertical L1-X motion vector difference;

wherein deriving the L1-X motion vector difference includes:

deriving a scaling factor by using a difference between a picture order count (POC) of a current picture and a POC of the LX reference picture, and a difference between a POC of the current picture and a POC of the L1-X reference picture; and calculating the horizontal L1-X motion vector difference and the vertical L1-X motion vector difference by using the scaling factor, the horizontal L1 motion vector difference, and the vertical LX motion vector difference.

12. The method of claim 11, further comprising:

encoding the reference picture indices that are in the bi-direction manner, the motion vector indices that are in the bi-direction manner, and the LX motion vector difference.

13. A method for providing a video decoding apparatus with video data, the method comprising:

encoding the video data into a bitstream; and transmitting the bitstream to the video decoding device, wherein the encoding of the video data comprises:

determining reference picture indices that are in a bi-direction manner and are of a current block, indicating reference pictures that include an LX reference picture, where X=0 or X=1, and an L1-X reference picture;

determining motion vector indices that are in the bi-direction manner, indicating motion vectors that are in the bi-direction manner and comprise an LX motion vector and an L1-X motion vector, the LX motion vector comprising a horizontal LX motion vector and a vertical LX motion vector, the L1-X motion vector comprising a horizontal L1-X motion vector and a vertical L1-X motion vector;

calculating an LX motion vector difference that comprises a horizontal LX motion vector difference and a vertical LX motion vector difference; and deriving an L1-X motion vector difference by using the LX motion vector difference, wherein the L1-X motion vector difference comprises a horizontal L1-X motion vector difference and a vertical L1-X motion vector difference;

wherein deriving the L1-X motion vector difference includes:

deriving a scaling factor by using a difference between a picture order count (POC) of a current picture and a POC of the LX reference picture, and a difference between a POC of the current picture and a POC of the L1-X reference picture; and calculating the horizontal L1-X motion vector difference and the vertical L1-X motion vector difference by using the scaling factor, the horizontal L1 motion vector difference, and the vertical LX motion vector difference.

* * * * *